(12) United States Patent
Nagata et al.

(10) Patent No.: US 9,535,507 B2
(45) Date of Patent: Jan. 3, 2017

(54) MOBILE TERMINAL AND INCOMING INFORMATION DISPLAY METHOD

(71) Applicant: KYOCERA CORPORATION, Kyoto (JP)

(72) Inventors: Keisuke Nagata, Kobe (JP); Tomoki Iwaizumi, Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/005,711

(22) Filed: Jan. 25, 2016

(65) Prior Publication Data

US 2016/0139677 A1 May 19, 2016

Related U.S. Application Data

(63) Continuation of application No. PCT/JP2014/069963, filed on Jul. 29, 2014.

(30) Foreign Application Priority Data

Jul. 29, 2013 (JP) .................................. 2013-156692

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/0346* (2013.01); *G06F 3/0482* (2013.01);
(Continued)

(58) Field of Classification Search
None
See application file for complete search history.

(56) References Cited

U.S. PATENT DOCUMENTS

2010/0023858 A1  1/2010  Ryu et al.
2014/0337149 A1* 11/2014  Ke ........................... G06F 3/017
                                                                  705/15

FOREIGN PATENT DOCUMENTS

JP    2012-208631 A   10/2012
JP    2013-020532 A    1/2013
WO   WO 2012/170446 A2  12/2012

OTHER PUBLICATIONS

International Search Report in International Patent Application No. PCT/JP2014/069963, dated Oct. 14, 2014, in 1 page.

(Continued)

*Primary Examiner* — Joseph Haley
(74) *Attorney, Agent, or Firm* — Duane Morris LLP

(57) ABSTRACT

A mobile terminal includes a display device, a detector, and a storage. The detector detects an attitude of the mobile terminal. The storage stores, when an event occurs, therein at least one piece of incoming information on the event. The mobile terminal further includes a first display control module and a second display control module. The first display control module displays, when the detection module detects a first attitude, a first tiled object relating to the at least one piece of incoming information and a second tiled object not relating to the at least one piece of incoming information on the display device. The second display control module displays, when the detection module detects a second attitude, the at least one piece of incoming information stored in the storage on the display device.

10 Claims, 25 Drawing Sheets

(51) Int. Cl.
*G06F 3/0482* (2013.01)
*G06Q 10/10* (2012.01)
*H04W 4/02* (2009.01)
*H04M 1/725* (2006.01)
*G06F 3/0346* (2013.01)
*G06F 3/0481* (2013.01)
*G06F 3/0484* (2013.01)
*G06F 3/0488* (2013.01)

(52) U.S. Cl.
CPC ...... *G06F 3/04817* (2013.01); *G06F 3/04842* (2013.01); *G06F 3/04883* (2013.01); *G06Q 10/107* (2013.01); *H04M 1/72519* (2013.01); *H04W 4/026* (2013.01); *G06F 2200/1614* (2013.01)

(56) References Cited

OTHER PUBLICATIONS

Written Opinion of the International Searching Authority in International Patent Application No. PCT/JP2014/069963, dated Oct. 14, 2014, in 4 pages.

* cited by examiner

0 DEGREES

90 DEGREES

180 DEGREES

F I G. 9
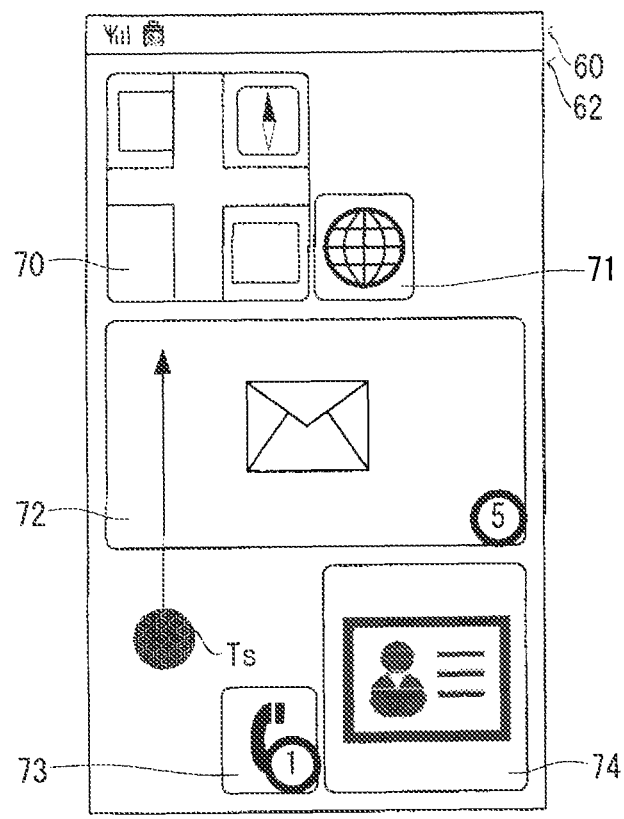

F I G. 2 0
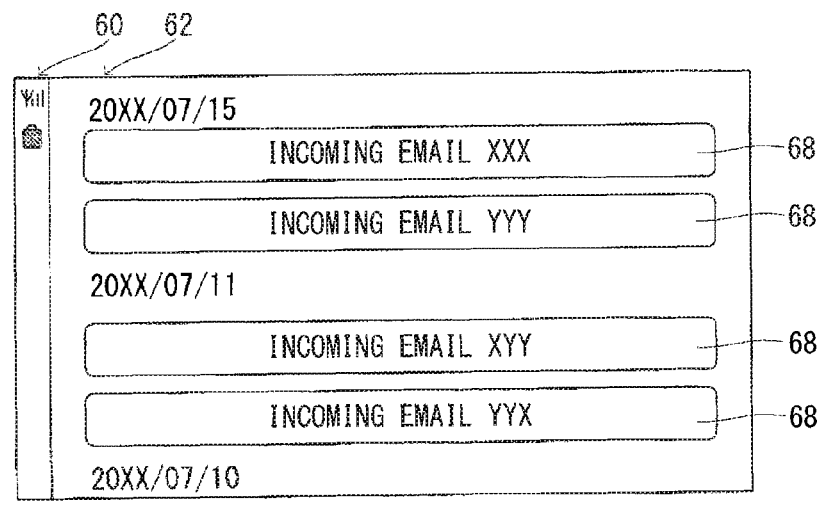
F I G. 2 1
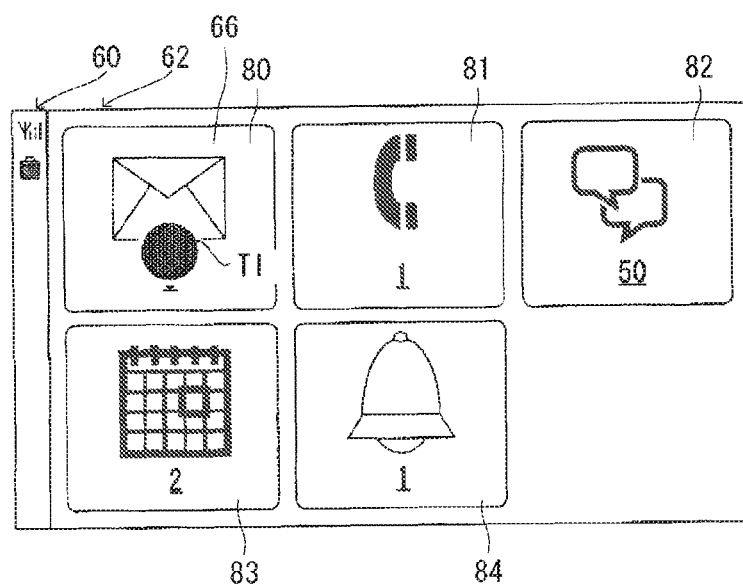

INCOMING INFORMATION TABLE

| TIME | FUNCTION | DETAILS |
|---|---|---|
| 07/15/2013 10:32:10 | SNS | A A A |
| 07/15/2013 9:50:00 | EMAIL | X X X |
| ⋮ | | |

…

MOBILE TERMINAL AND INCOMING INFORMATION DISPLAY METHOD

CROSS-REFERENCE TO RELATED APPLICATIONS

The present application is a continuation of International Application No. PCT/JP2014/069963, filed on Jul. 29, 2014, which claims the benefit of Japanese Patent Application No. 2013-156692, filed on Jul. 29, 2013. Both International Application No. PCT/JP2014/069963 and Japanese Patent Application No. 2013-156692 are entitled "PORTABLE TERMINAL, NEW-ARRIVAL INFORMATION DISPLAY PROGRAM, AND NEW-ARRIVAL INFORMATION DISPLAY METHOD." The contents of these applications are incorporated herein by reference in their entirety.

FIELD

Embodiments of the present disclosure relate to a mobile terminal displaying incoming information on events that occurred.

BACKGROUND

In some mobile terminals, a plurality of icons is arranged and displayed on a touch panel display.

SUMMARY

A mobile terminal and an incoming information display method are disclosed. In one embodiment, a mobile terminal includes a display device, a detector, a storage, a first display control module, and a second display control module. The detector detects an attitude of the mobile terminal. The storage stores, when an event occurs, stores therein at least one piece of incoming information on the event. The first display control module displays, when the detection module detects a first attitude, a first tiled object relating to the at least one piece of incoming information and a second tiled object not relating to the at least one piece of incoming information on the display device. The second display control module displays, when the detection module detects a second attitude, the at least one piece of incoming information stored in the storage on the display device.

In one embodiment, an incoming information display method is a method for use in a mobile terminal including a storage, a display device, and a detector that detects an attitude of the mobile terminal. A processor of the mobile terminal performs a storage step, a first display step, and a second display step. The storage step is a step of storing, when an event occurs, a piece of incoming information on the event in the storage. The first display step is a step of displaying, when the detector detects a first attitude, a first tiled object relating to the piece of incoming information and a second tiled object not relating to the piece of incoming information on the display device. The second display step is a step of displaying, when the detector detects a second attitude, the piece of incoming information stored in the storage step on the display device.

In one embodiment, a mobile terminal includes a display device, a detector, a storage, and a display control module. The detector detects an attitude of the mobile terminal. The storage stores, when an event occurs, therein a piece of incoming information on the event. The display control module displays, when the detector detects a change from a first attitude to a second attitude, the piece of incoming information stored in the storage on the display device.

BRIEF DESCRIPTION OF DRAWINGS

FIG. 9 illustrates an example of a slide operation performed on the home screen.

FIG. 20 illustrates an example of displaying pieces of incoming information in accordance with the flick operation performed on the functional tile.

FIG. 21 illustrates an example of performing a long-tap operation on a functional tile.

DETAILED DESCRIPTION

Figure 1:
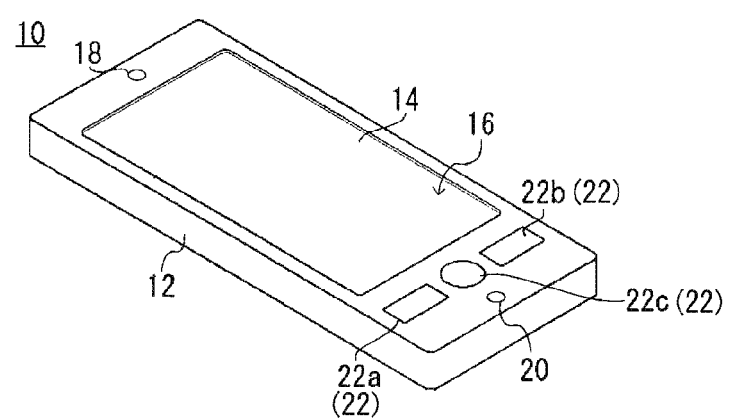
FIG. 1 illustrates the appearance of a mobile phone according to one embodiment.

As illustrated in FIG. 1, a mobile terminal according to one embodiment is, for example, a mobile phone 10 such as a smartphone. The mobile phone 10 includes a flat longitudinal rectangular housing 12. The mobile terminal, however, is not limited to the mobile phone 10 as illustrated in FIG. 1, and may be a tablet terminal, a tablet PC, a note PC, and a PDA each having a touch panel.

A display 14, such as a liquid crystal panel and an organic EL panel, is located at a main surface (front surface) of the housing 12. The display 14 is also referred to as a display device. A touch panel 16 is located on the display 14.

A speaker 18 is embedded in the housing 12 on side of the main surface at one end in a longitudinal direction of the housing 12, and a microphone 20 is embedded in the housing 12 on side of the main surface at another end in the longitudinal direction.

A plurality of hard keys 22, which constitute an input operation means along with the touch panel 16, are provided at the main surface of the housing 12. In one embodiment, the hard keys 22 include a call key 22a, an end key 22b, and a home key 22c.

For example, a user can input phone numbers by performing a touch operation on a dialpad displayed on the display 14, and can start voice calls by operating the call key 22a. The user can end voice calls by operating the end key 22b. The user can power on and off the mobile phone 10 by long-pressing the end key 22b.

When the user operates the home key 22c, a home screen is displayed on the display 14. By performing a touch operation on a GUI and the like displayed on the display 14 in this state, the user can select an object, and determine the selection.

The mobile phone 10 can perform not only a phone function but also an email function, a browser function, and the like. In the following description, a GUI such as a key, an icon, and the like displayed on the display 14 are collectively referred to as objects.

Figure 2:
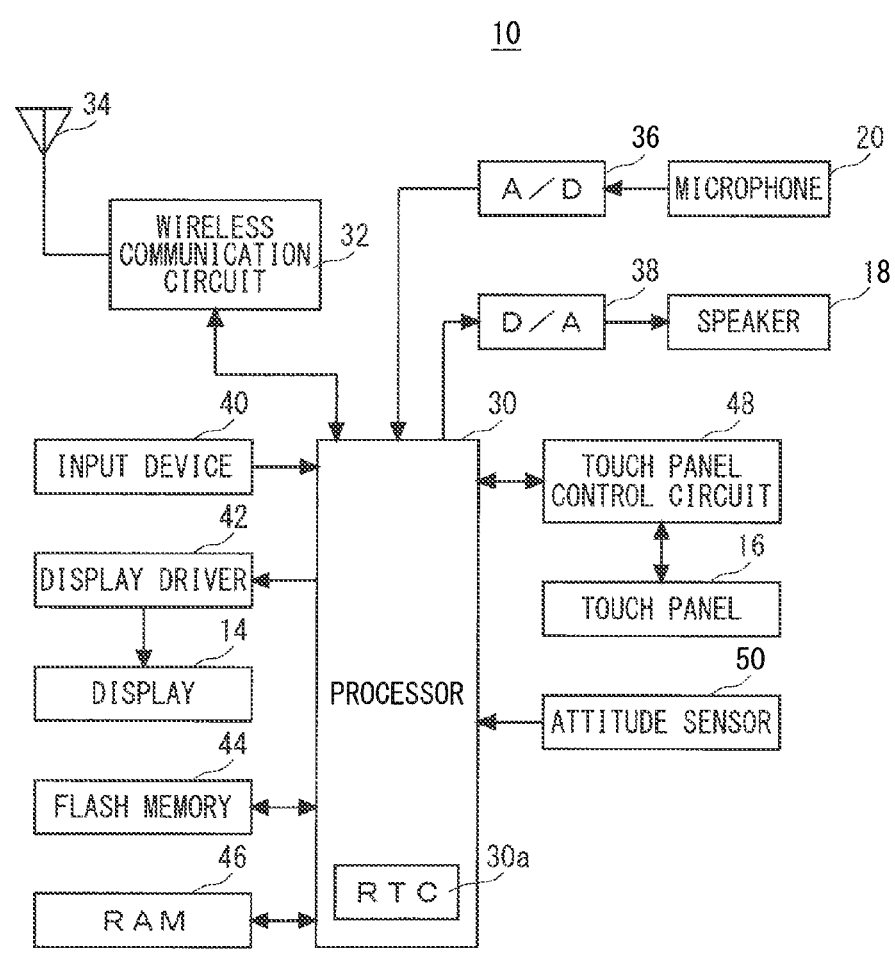
FIG. 2 illustrates an example of electrical configuration of the mobile phone according to one embodiment.

As illustrated in FIG. 2, the mobile phone 10 according to one embodiment includes a processor 30 referred to as a computer or a CPU. A wireless communication circuit 32, an A/D converter 36, a D/A converter 38, an input device 40, a display driver 42, flash memory 44, RAM 46, a touch panel control circuit 48, an attitude sensor 50, and the like are connected to the processor 30.

Figure 3:
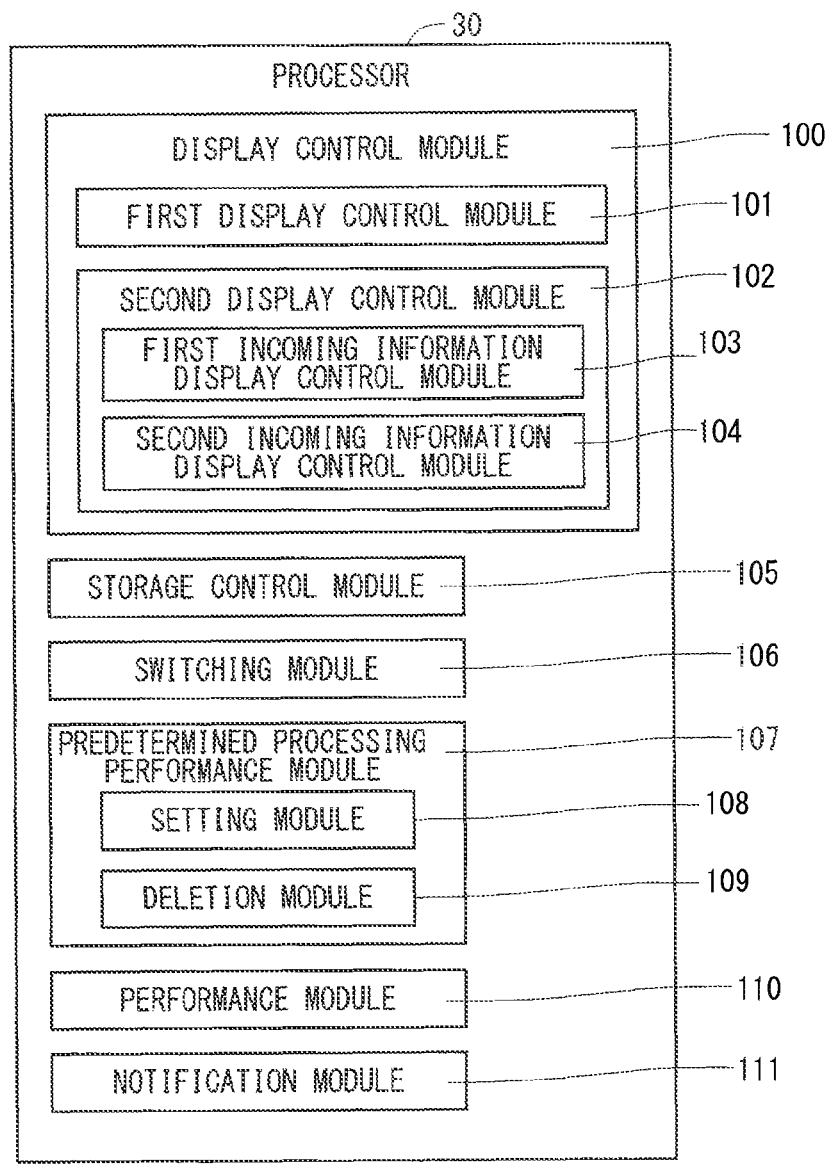
FIG. 3 illustrates functional configuration formed by a processor according to one embodiment.

The processor 30 can control the mobile phone 10 as a whole, and includes a real-time clock (RTC) 30a that can output date and time information. All or some programs preset in the flash memory 44 are developed on the RAM 46 in use. The processor 30 operates in accordance with the programs on the RAM 46 to achieve a plurality of functional blocks relating to the mobile phone 10. More specifically, as illustrated in FIG. 3, the programs on the RAM 46 are run in the processor 30 to form a display control module 100, a storage control module 105, a switching module 106, a predetermined processing performance module 107, a performance module 110, and a notification module 111. The display control module 100 includes a first display control module 101 and a second display control module 102. The second display control module 102 includes a first incoming information display control module 103 and a second incoming information display control module 104. The predetermined processing performance module 107 includes a setting module 108 and a deletion module 109. Each of the functional blocks is described in an embodiment described below. The RAM 46 is also used as a working area or a buffer area of the processor 30. In one embodiment, the RAM 46 and the flash memory 44 are also referred to as a storage.

Referring back to FIG. 2, the input device 40 includes the hard keys 22 illustrated in FIG. 1. The input device 40 forms an operation reception module that can receive key operations on the hard keys 22 from the user. Information (key data) on the hard keys operated by the user is input through the input device 40 to the processor 30.

The wireless communication circuit 32 is a circuit for transmitting and receiving radio waves for voice calls and emails through an antenna 34. In one embodiment, the wireless communication circuit 32 is a circuit for performing wireless communication in accordance with a CDMA system. For example, if the user provides directions to make a call (transmit voice) by operating the touch panel 16, the wireless communication circuit 32 can perform voice transmission processing and output a voice transmission signal through the antenna 34 under the directions of the processor 30. The voice transmission signal is transmitted to a phone of a recipient through a base station and a communication network. When voice reception processing is performed in the phone of the recipient, a communicable state is established, and the processor 30 can perform call processing.

The microphone 20 illustrated in FIG. 1 is connected to the A/D converter 36. The A/D converter 36 can convert voice signals from the microphone 20 into digital voice data, and input the digital voice data into the processor 30. On the other hand, the speaker 18 is connected to the D/A converter 38. The D/A converter 38 can covert digital voice data into voice signals, and provide the voice signals to the speaker 18 through an amplifier. Voice based on the voice data is thus output from the speaker 18. When the call processing is being performed, voice collected by the microphone 20 is transmitted to the phone of the recipient, and voice collected by the phone of the recipient is output from the speaker 18.

The processor 30 can adjust the volume of voice output from the speaker 18 by controlling an amplification factor of the amplifier connected to the D/A converter 38 in response to a volume adjustment operation performed by the user, for example.

The display 14 illustrated in FIG. 1 is connected to the display driver 42. Videos or images are displayed on the display 14 in accordance with video data or image data output from the functional blocks, such as the display control module 100, formed by the processor 30. The display driver 42 includes video memory for temporarily storing image data to be displayed on the display 14. Data output from the processor 30 is stored in the video memory. The display driver 42 can display images on the display 14 in accordance with the contents of the video memory. This means that the display driver 42 can control display on the display 14 connected to the display driver 42 under the directions of the processor 30. A backlight is provided on the display 14. The display driver 42 can control brightness and turning-on and -off of the backlight in accordance with the directions of the processor 30.

The touch panel 16 illustrated in FIG. 1 is connected to the touch panel control circuit 48. The touch panel control circuit 48 can provide necessary voltage and the like to the touch panel 16. The touch panel control circuit 48 can also input, into the processor 30, a touch start signal indicating the start of a touch of the user on the touch panel 16, an end signal indicating the end of the touch of the user, and coordinate data indicating a touch position of the touch of the user. The processor 30 can thus determine an object touched by the user based on the coordinate data.

In one embodiment, the touch panel 16 is a capacitive touch panel that can detect a change in capacitance caused between the surface of the touch panel 16 and a thing such as a finger. The touch panel 16 can detect a touch of one or more fingers on the touch panel 16, for example. The touch panel 16 is thus also referred to as a pointing device. The touch panel control circuit 48 can detect a touch operation in a touch detectable range of the touch panel 16, and output coordinate data indicating the position of the touch operation to the processor 30. This means that the user performs a touch operation on the surface of the touch panel 16 to input the position, the direction, and the like of the operation into the mobile phone 10.

The mobile phone 10 may include a non-transitory recording medium readable by the processor 30 in addition to the RAM 46 and the flash memory 44. The mobile phone 10 may include a hard disk drive, a solid state drive (SSD), universal serial bus (USB) memory, and the like, for example.

In one embodiment, the touch operation includes a tap operation, a long-tap operation, a flick operation, a slide operation, and the like.

The tap operation refers to an operation to touch the surface of the touch panel 16 with a finger and then release the finger from the surface of the touch panel 16 in a short time. The long-tap operation refers to an operation to touch the surface of the touch panel 16 with a finger for a predetermined time or more and then release the finger from the surface of the touch panel 16. The flick operation refers to an operation to touch the surface of the touch panel 16 with a finger and flick the surface of the touch panel 16 with the finger in any direction at a predetermined speed or more. The slide operation refers to an operation to move a finger on the surface of the touch panel 16 in any direction with the finger being in contact with the surface of the touch panel 16 and then release the finger from the surface of the touch panel 16.

The above-mentioned slide operation includes a slide operation to touch a display object displayed on the surface of the display 14 with a finger and move the display object, a so-called drag operation. An operation to release the finger from the surface of the touch panel 16 after the drag operation is referred to as a drop operation.

In the following description, the tap operation, the long-tap operation, the flick operation, the slide operation, the drag operation, and the drop operation may each be described by omitting a term "operation". The touch operation may be performed not only with a finger of the user but also with a stylus pen or the like.

The attitude sensor 50 functions as a detector, and can detect an attitude and movement of the mobile phone 10. For example, the attitude sensor 50 includes a gyro sensor that can detect rotation (angular velocities) of three axes (x-, y-, and z-axes) of the mobile phone 10 and an acceleration sensor that can detect accelerations along the three axes (x-, y-, and z-axes) of the mobile phone 10. The gyro sensor and the acceleration sensor are integrally formed by micro electro mechanical systems (MEMS) technology. The attitude sensor 50 is also referred to as a six-axis motion sensor. The processor 30 can detect an attitude (a tilt) and movement of the mobile phone 10 based on the angular velocities of the three axes and the accelerations along the three axes output from the attitude sensor 50. The acceleration sensor and the gyro sensor may separately be provided in place of the attitude sensor 50.

Figure 4:
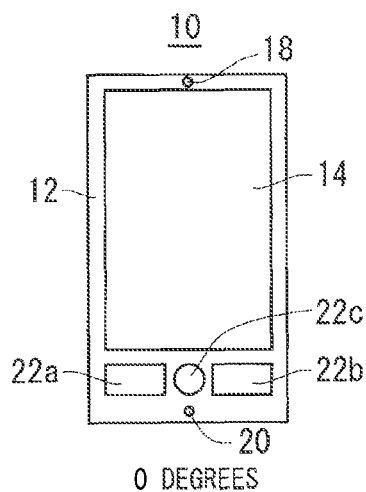
FIG. 4 illustrates an example of the mobile phone in a vertical attitude.
Figure 5:
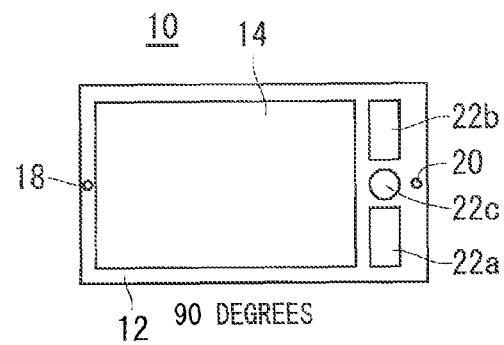
FIG. 5 illustrates an example of the mobile phone in a counterclockwise horizontal attitude.
Figure 6:
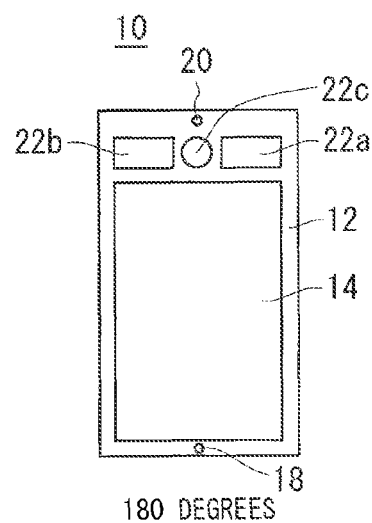
FIG. 6 illustrates an example of the mobile phone in an inverted attitude.
Figure 7:
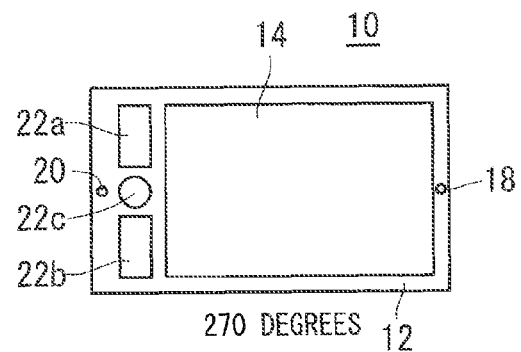
FIG. 7 illustrates an example of the mobile phone in a clockwise horizontal attitude.

FIGS. 4 to 7 illustrate examples of the attitude of the mobile phone 10. When the mobile phone 10 is rotated with a display surface of the display 14 being directed towards the same direction, the attitude of the mobile phone 10 with respect to output of the attitude sensor 50 is as follows. FIG. 4 illustrates a case where output of the attitude sensor 50 is 0 degrees, and the mobile phone 10 is in a vertical attitude. FIG. 5 illustrates a case where output of the attitude sensor 50 is 90 degrees, and the mobile phone 10 is in a counterclockwise horizontal attitude. FIG. 6 illustrates a case where output of the attitude sensor 50 is 180 degrees, and the mobile phone 10 is in an inverted attitude. FIG. 7 illustrates a case where output of the attitude sensor 50 is 270 degrees, and the mobile phone 10 is in a clockwise horizontal attitude. As described above, the angle output from the attitude sensor 50 increases as the mobile phone 10 is rotated in a counterclockwise direction with the display surface of the display 14 being directed forwards. In one embodiment, display on the display 14 varies depending on the attitude of the mobile phone 10. The counterclockwise horizontal attitude and the clockwise horizontal attitude are simply referred to as a "horizontal attitude" when not distinguished from each other.

Figure 8:
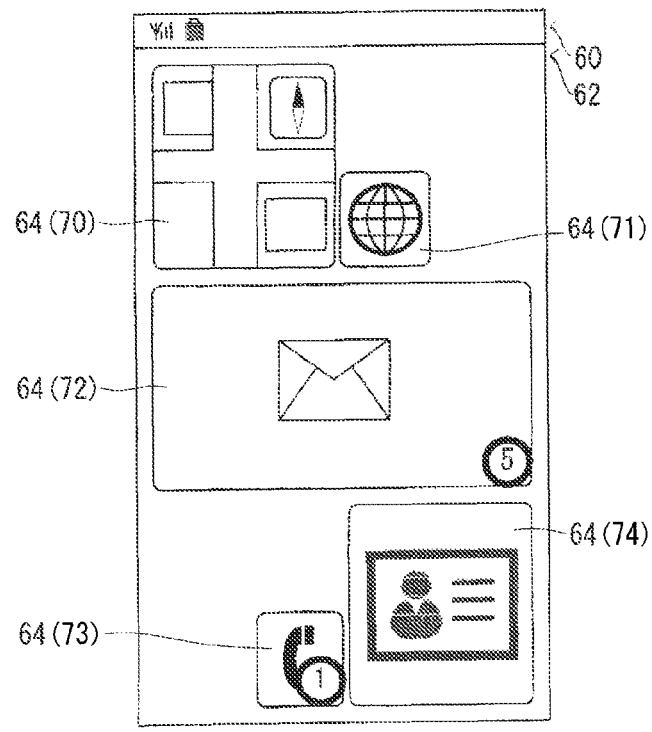
FIG. 8 illustrates an example of displaying a home screen on a display.

FIG. 8 illustrates an example of the home screen displayed on the display 14. A display range of the display 14 includes a state display area 60 and a function display area 62. In the state display area 60, a picto indicating a radio wave reception state of the antenna 34, a picto indicating the amount of power remaining in a secondary battery, and time are displayed. In the function display area 62, a home screen including tiled objects 64 (hereinafter, simply referred to as tiles 64) corresponding to respective functions is displayed. The home screen is displayed on the display 14 by the processor 30 (first display control module 101).

The tiles 64 are shortcuts for the respective functions. The user can cause the mobile phone 10 to perform the functions corresponding to the tiles 64 by tapping the tiles 64. Display states, namely the display positions and the display sizes, of the tiles 64 can be changed to any display states. The user can further cause the mobile phone 10 to add a tile 64 corresponding to any function to the home screen. The functions in one embodiment include an application installed in the mobile phone 10 as well as a function to change settings of the mobile phone 10.

In the home screen illustrated in FIG. 8, the first display control module 101 displays a map tile 70 corresponding to a map function, a browser tile 71 corresponding to a browser function, an email tile 72 corresponding to an email function, a phone tile 73 corresponding to a phone function, and an address book tile 74 corresponding to an address book function.

If an event occurs through performance of a function, the storage control module 105 can store a piece of incoming information in the RAM 46. If any pieces of incoming information are stored in the RAM 46, the number of pieces of incoming information is shown in a display range of a tile 64 corresponding to the function. For example, if five incoming emails are stored in the RAM 46 as pieces of incoming information through performance of the email function, and one incoming call (missed call) is stored in the RAM 46 as a piece of incoming information through performance of the phone function, a number icon showing "5" as the number of pieces of incoming information is displayed in a display range of the email tile 72, and a number icon showing "1" as the number of pieces of incoming information is displayed in a display range of the phone tile 73.

When the tap operation is performed on a tile 64, a function corresponding to the tile 64 is performed. When the function corresponding to the tile 64 is performed with the number icon being displayed in the display range of the tile 64, the function corresponding to the tile 64 is performed so that a screen relating to a piece of incoming information is displayed. For example, if the tap operation is performed on the email tile 72, the email function is performed so that the latest incoming email is displayed.

When the long-tap operation is performed on a tile 64, the tile 64 becomes editable. In this state, the display size and the display position of the tile 64 can be changed, and the tile 64 can be deleted. Even if the tile 64 is deleted, a corresponding application is not uninstalled. As described above, the user can cause the mobile phone 10 to perform any functions based on the tiles 64 displayed in the home screen.

In other embodiments, results of performance of a function in the background may be displayed as live information in a display range of a tile 64 corresponding to the function. For example, in the case of the email tile 72, a subject of an incoming email is displayed as the live information along with the number icon in the display range of the email tile 72.

Figure 10:
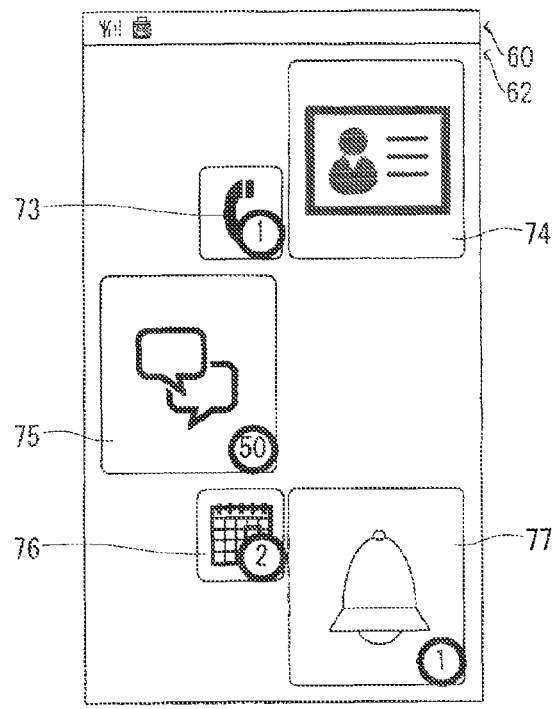
FIG. 10 illustrates an example of the home screen scrolled in accordance with the slide operation.

The slide operation performed in the home screen is described with reference to FIGS. 9 and 10. The user can display other tiles 64 in the home screen by scrolling the home screen vertically. For example, if the user performs a slide operation Ts upwards as illustrated in FIG. 9, the home screen is scrolled upwards. When the home screen is scrolled upwards, the map tile 70, the browser tile 71, and the email tile 72 are hidden, and a social networking service (an SNS) tile 75 corresponding to an application of an SNS such as Twitter® and Facebook®, a schedule tile 76 corresponding to a schedule function, and an alarm tile 77 corresponding to an alarm function are newly displayed, as illustrated in FIG. 10.

As for the SNS tile 75, the schedule tile 76, and the alarm tile 77 newly displayed through scrolling, events occur through performance of corresponding functions, and pieces of incoming information are stored in the RAM 46. For example, in the SNS function, 50 pieces of incoming information are stored in the RAM 46 as 50 comments have been posted to an uploaded article. In the schedule function, two pieces of incoming information are stored in the RAM 46 as notification processing has been performed with respect to two registered schedules. In the alarm function, one piece of incoming information is stored in the RAM 46 as the user has been notified of arrival of registered alarm time. Thus, a number icon showing "50" is displayed in a display range of the SNS tile 75, a number icon showing "2" is displayed in a display range of the schedule tile 76, and a number icon showing "1" is displayed on the alarm tile 77.

When many tiles 64 are added to the home screen, not all tiles 64 may be displayed in an initial state of the home screen, i.e., before the home screen is scrolled. While a number icon is displayed in a display range of a tile 64 if any piece of incoming information is stored in the RAM 46, the user may have to check all the tiles 64 by scrolling the home screen to know whether any piece of incoming information is stored in the RAM 46 (mobile phone 10).

In one embodiment, the second display control module 102 can display one or more pieces of incoming information on the display 14 when the attitude of the mobile phone 10 is switched from the vertical attitude to the horizontal attitude. This allows the user to easily check the pieces of incoming information.

Figure 11:
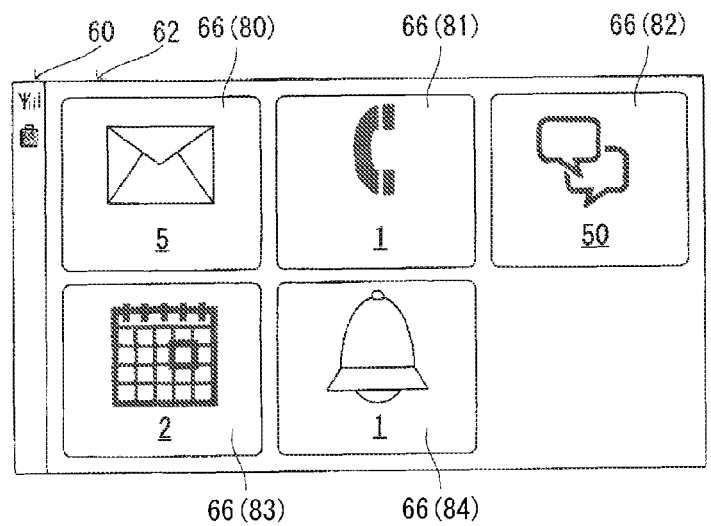
FIG. 11 illustrates an example of displaying pieces of incoming information on the display.

As illustrated in FIG. 11, when the attitude of the mobile phone 10 changes from the vertical attitude (see FIG. 4) to the counterclockwise horizontal attitude (see FIG. 5), the first incoming information display control module 103 of the second display control module 102 can display functional tiles 66 corresponding to pieces of incoming information of respective functions on the display 14. For example, if pieces of incoming information of the email function, the phone function, the SNS function, the schedule function, and the alarm function are stored in the RAM 46 as illustrated in FIGS. 9 and 10, the second display control module 102 (first incoming information display control module 103) can display a functional tile 80 corresponding to the email function, a functional tile 81 corresponding to the phone function, a functional tile 82 corresponding to the SNS function, a functional tile 83 corresponding to the schedule function, and a functional tile 84 corresponding to the alarm function on the display 14. Each of the functional tiles corresponds to one or more pieces of incoming information of the function, and shows the number of corresponding pieces of incoming information. For example, the functional tile 80 corresponding to the email function shows "5" as the number of pieces of incoming information, the functional tile 81 corresponding to the phone function shows "1" as the number of pieces of incoming information, the functional tile 82 corresponding to the SNS function shows "50" as the number of pieces of incoming information, the functional tile 83 corresponding to the schedule function shows "2" as the number of pieces of incoming information, and the functional tile 84 corresponding to the alarm function shows "1" as the number of pieces of incoming information. By performing a predetermined touch operation on a functional tile 66, the user can cause the mobile phone 10 to perform a function corresponding to the functional tile 66, which is described in detail below. This means that the user can determine a function to be performed by the mobile phone 10 while knowing the number of pieces of incoming information of each function.

When seven or more functional tiles 66 are displayed, the display size of each of the functional tiles 66 is adjusted so that all the functional tiles 66 can be displayed in a single screen. In other embodiments, however, when seven or more functional tiles 66 are displayed, six functional tiles 66 may be displayed in a single screen, and the remaining functional tiles 66 may be displayed if the screen is scrolled through a scroll operation. Detailed description on the touch operation performed on a functional tile 66 is omitted herein as it is described below.

Figure 12:
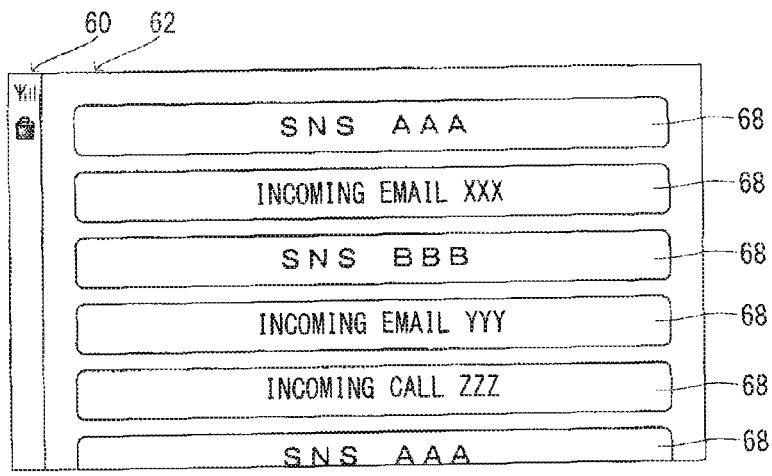
FIG. 12 illustrates an example of displaying pieces of incoming information on the display.

When the attitude of the mobile phone 10 changes from the vertical attitude to the counterclockwise horizontal attitude with the touch panel 16 being touched, the second incoming information display control module 104 of the second display control module 102 can display incoming tiles 68 corresponding to respective pieces of incoming information on the display 14 in chronological order as illustrated in FIG. 12. The second display control module 102 (second incoming information display control module 104) can arrange the incoming tiles 68 in the order in which the pieces of incoming information have been recorded, and display the arranged incoming tiles 68 on the display 14. More specifically, the incoming tiles 68 are displayed on the display 14 so that an incoming tile 68 corresponding to the latest piece of incoming information is displayed at the top of the display 14. In a display range of each of the displayed incoming tiles 68, a character string indicating a function and information indicating details of a piece of incoming information are displayed. In the case of the incoming tile 68 of the SNS, for example, "SNS" is displayed as the character string indicating the function, and "AAA" (a name of a person who posted a comment) is displayed as the details of the piece of incoming information in the display range. By performing the touch operation on the incoming tile 68, the user can cause the mobile phone 10 to perform the function corresponding to the piece of incoming information, which is described in detail below. This means that the user can determine the function to be performed by the mobile phone 10 while checking the order in which the pieces of incoming information have been stored.

As described above, in one embodiment, the user can easily check pieces of incoming information on events as the pieces of incoming information are displayed together. The user can also switch between display of the pieces of incoming information by function and display of the pieces of incoming information in chronological order by shaking (performing a particular operation on) the mobile phone 10. More specifically, when the particular operation performed by the user is detected, the switching module 106 can switch between display of the pieces of incoming information on the display 14 by the first incoming information display control module 103 and display of the pieces of incoming information on the display 14 by the second incoming information display control module 104. If the user cannot determine the function to be performed in one of the display states, the user can switch the display state to the other one of the display states to consider the function to be performed. When the attitude of the mobile phone 10 is returned from the horizontal attitude to the vertical attitude, the home screen is displayed again.

Figure 13:
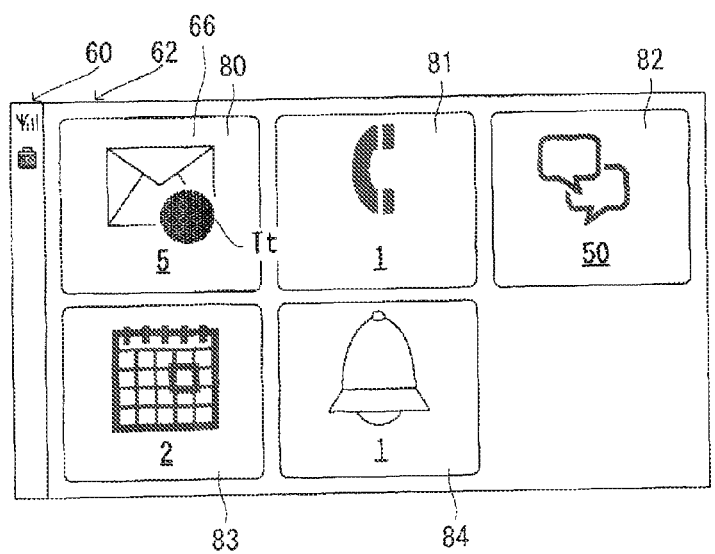
FIG. 13 illustrates an example of performing a tap operation on a functional tile.
Figure 14:
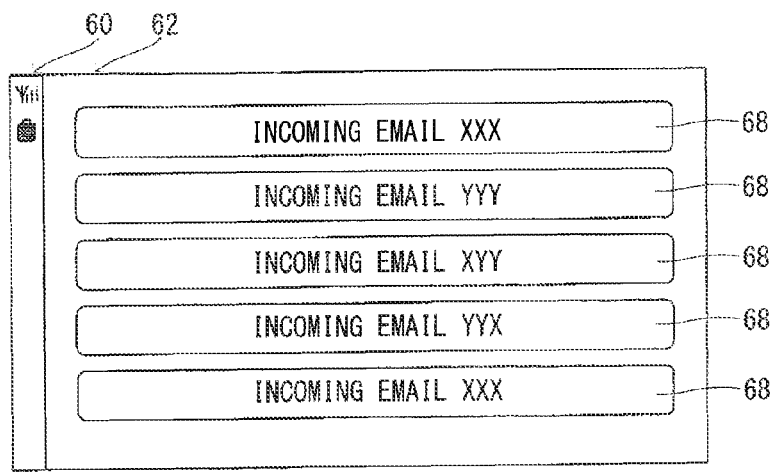
FIG. 14 illustrates an example of displaying pieces of incoming information on the display.

The tap operation performed on a functional tile 66 is described with reference to FIGS. 13 and 14. For example, when a tap operation Tt is performed on the functional tile 80 corresponding to the email function as illustrated in FIG. 13, incoming tiles 68 corresponding to pieces of incoming information of the email function are displayed in chronological order as illustrated in FIG. 14. This means that the user can display incoming tiles 68 corresponding to pieces of incoming information of a particular function on the display 14.

The display state returns to that of FIG. 13 when the slide operation is performed from an upper end to a lower end of the display 14 with the incoming tiles 68 corresponding to the pieces of incoming information of the function being displayed in chronological order as illustrated in FIG. 14. In other embodiments, the slide operation may be a slide operation performed from a left end (right end) to a right end (left end), and may be performed in the opposite direction. A key operation may be performed in place of the slide operation.

Figure 15:
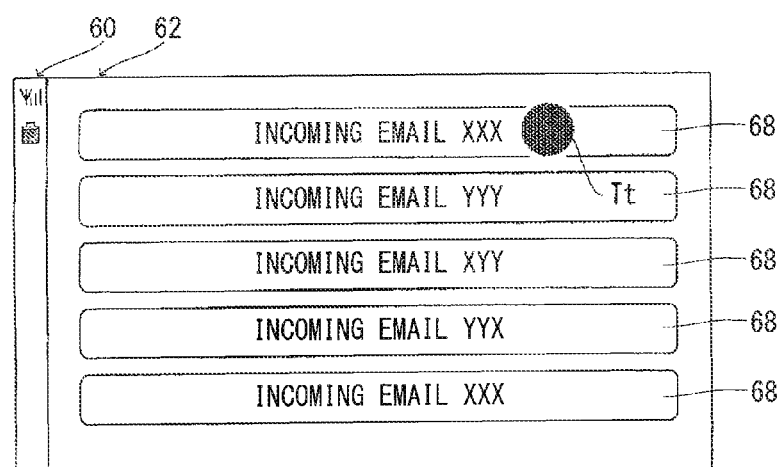
FIG. 15 illustrates an example of performing a tap operation on a piece of incoming information displayed on the display.
Figure 16:
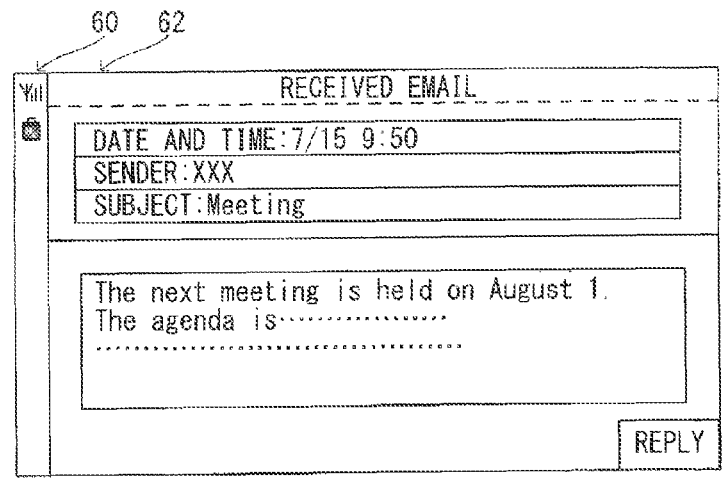
FIG. 16 illustrates an example of performing a function in accordance with the tap operation performed on the piece of incoming information displayed on the display.

Next, when the tap operation is performed on any incoming tile 68 with only the incoming tiles 68 corresponding to the pieces of incoming information of the particular function being displayed as illustrated in FIG. 14, the particular function is performed based on a corresponding piece of incoming information. For example, if the tap operation Tt is performed on an incoming tile 68 showing "INCOMING EMAIL XXX" as illustrated in FIG. 15, the email function is performed, and an incoming email sent from "XXX" is displayed on the display 14 as illustrated in FIG. 16.

As described above, by checking pieces of incoming information of a particular function by tapping the functional tile 66, and then selecting an incoming tile 68 corresponding to a necessary piece of incoming information through the touch operation, the user can cause the mobile phone 10 to perform a function corresponding to the necessary piece of incoming information. This means that the user can easily cause the mobile phone 10 to perform the function by using the piece of incoming information.

A case where the touch operation such as the flick operation and the long-tap operation is performed on a piece of incoming information (a functional tile 66 or an incoming tile 68) displayed on the display 14 is described next. When the touch operation is performed on a piece of incoming information displayed on the display 14, the predetermined processing performance module 107 can perform predetermined processing based on a function corresponding to the piece of incoming information on which the touch operation has been performed and a type of the touch operation.

Figure 17:
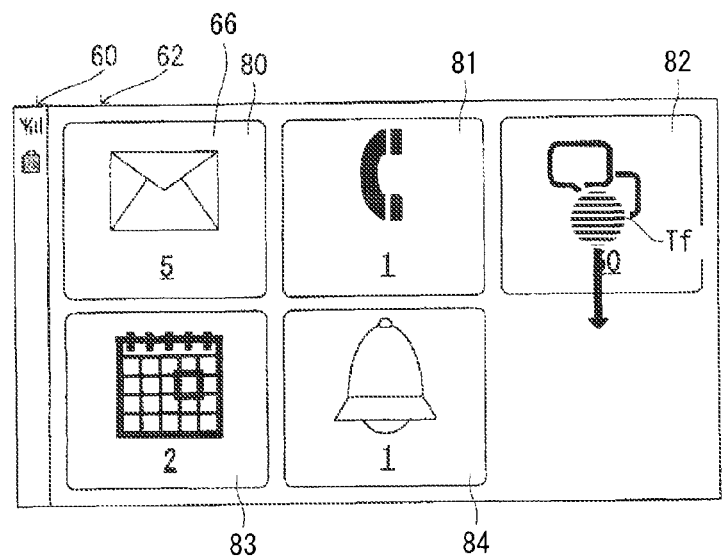
FIG. 17 illustrates an example of performing a flick operation on a functional tile.
Figure 18:
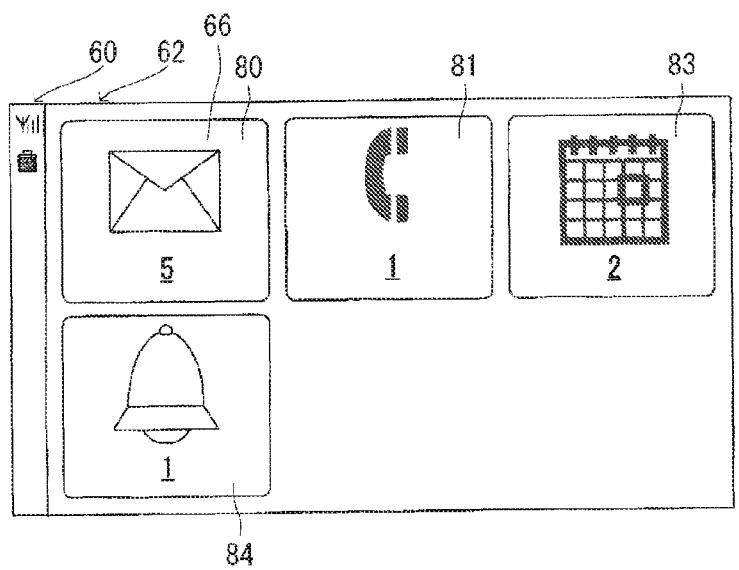
FIG. 18 illustrates an example of removing display of a piece of incoming information in accordance with the flick operation performed on the functional tile.

First, a case where a downward flick operation is performed on a functional tile 66 is described with reference to FIGS. 17 and 18. When the downward flick operation is performed on a functional tile 66, the setting module 108 of the predetermined processing performance module 107 can set a piece of information (e.g., an incoming call history, an incoming email, and a post of a new comment) obtained in an event corresponding to each of all the pieces of incoming information corresponding to the functional tile 66 on which the downward flick operation has been performed to a checked state. For example, if a flick operation Tf is performed downwards on the functional tile 82 corresponding to the SNS function as illustrated in FIG. 17, the setting module 108 can set each of new comments corresponding to 50 pieces of incoming information stored through posting of the new comments to a checked state as illustrated in FIG. 18. The deletion module 109 of the predetermined processing performance module 107 can delete the functional tile 82.

Although not illustrated, as for pieces of incoming information of incoming emails, the incoming emails are set to a read state. As for pieces of incoming information of incoming calls, an incoming call history is set to a checked state. Thus, when a plurality of pieces of incoming information of a certain function are stored, but the user determines that there is no need to check details of each of the plurality of stored pieces of incoming information, the user can collectively set the pieces of incoming information of the function to a checked state. The user can thus check the pieces of incoming information efficiently.

Figure 19:
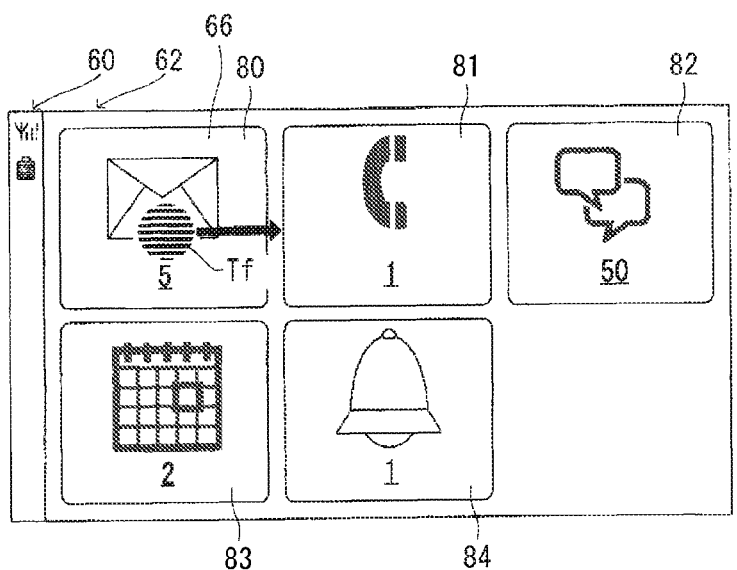
FIG. 19 illustrates an example of performing a flick operation on a functional tile.

A case where the flick operation is performed on a functional tile 66 is described with reference to FIGS. 19 and 20. When a rightward flick operation is performed on a functional tile 66 as illustrated in FIG. 19, the predetermined processing performance module 107 can classify pieces of incoming information corresponding to the functional tile 66 based on a predetermined condition, and display the classified pieces of incoming information on the display 14. For example, if the flick operation Tf is performed to the right on the functional tile 80 corresponding to the email function, the predetermined processing performance module 107 can classify incoming tiles 68 corresponding to pieces of incoming information according to the date, and display the classified incoming tiles 68 on the display 14.

Although not illustrated, when an upward flick operation is performed on the functional tile 80 corresponding to the email function and the functional tile 81 corresponding to the phone function, the predetermined processing performance module 107 can classify pieces of incoming information according to the originator (email sender and caller), and display the classified pieces of incoming information on the display 14. For example, if the upward flick operation is performed on the functional tile 80 corresponding to the email function, the predetermined processing performance module 107 can display incoming tiles 68 corresponding to pieces of incoming information by sender on the display 14. If the upward flick operation is performed on the functional tile 81 corresponding to the phone function, the predetermined processing performance module 107 can display incoming tiles 68 corresponding to pieces of incoming information by caller on the display 14.

Although not illustrated, when a leftward flick operation is performed on the functional tile 80 corresponding to the email function and the functional tile 81 corresponding to the phone function, the predetermined processing performance module 107 can display a tile showing the number of pieces of incoming information registered in an address book and a tile showing the number of pieces of incoming information not registered in the address book on the display 14. For example, if senders of incoming emails corresponding to three pieces of incoming information are registered in the address book and senders of incoming emails corresponding to two pieces of incoming information are not registered in the address book when the leftward flick operation is performed on the functional tile 80 corresponding to the email function, a tile showing "registered: 3" and a tile showing "unregistered: 2" are displayed on the display 14. The touch operation performed on these two tiles is approximately the same as the touch operation performed on the functional tiles 66. For example, when the downward flick operation is performed on the tile showing "unregistered: 2", the predetermined processing performance module 107 can set each of two incoming emails whose senders are not registered in the address book to a read state.

As described above, the user can cause the mobile phone 10 to perform various types of processing relating to a piece of incoming information by performing the touch operation on a tile corresponding to the piece of incoming information. This improves convenience of the user.

Figure 22:
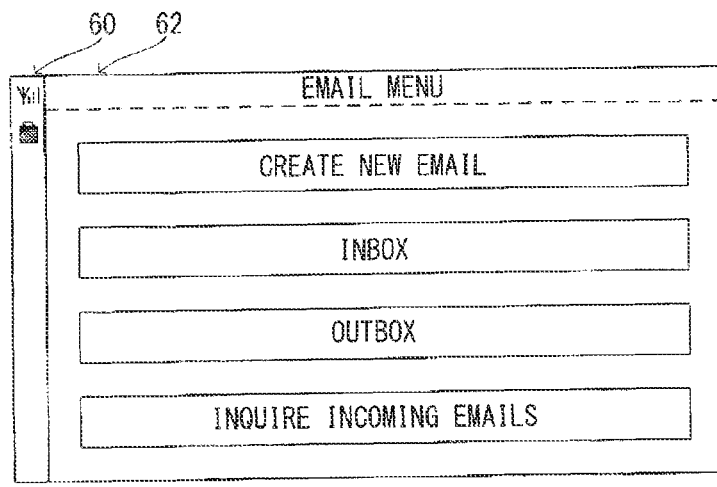
FIG. 22 illustrates an example of performing a function in accordance with the long-tap operation performed on the functional tile.

A case where the long-tap operation is performed on a functional tile 66 is described with reference to FIGS. 21 and 22. When the long-tap operation is performed on a functional tile 66, a corresponding function is performed regardless of pieces of incoming information. For example, if a long-tap operation T1 is performed on the functional tile 80 corresponding to the email function as illustrated in FIG. 21, the performance module 110 can perform the email function. More specifically, the performance module 110 can perform the email function, and can display an email menu screen (a top screen) of the email function on the display 14 as illustrated in FIG. 22. As a result, when the user checks a plurality of pieces of incoming information, the user can check each of the pieces of incoming information after causing the mobile phone 10 to perform the function corresponding to the pieces of incoming information.

Figure 23:
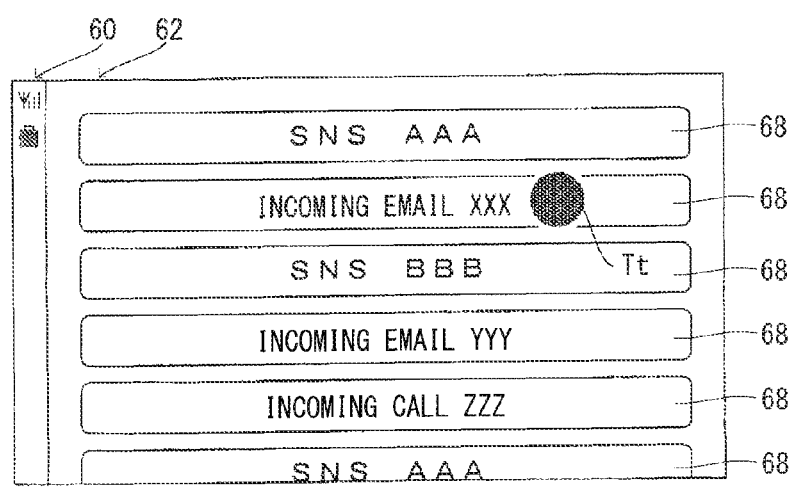
FIG. 23 illustrates an example of performing a tap operation on a piece of incoming information displayed on the display.
Figure 24:
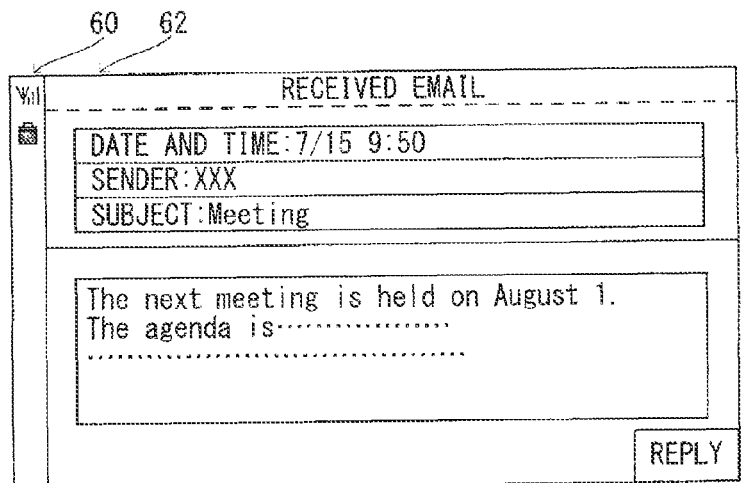
FIG. 24 illustrates an example of performing a function in accordance with the tap operation performed on the piece of incoming information displayed on the display.

The tap operation performed in a state in which pieces of incoming information are displayed in chronological order is described next with reference to FIGS. 23 and 24. When the tap operation is performed on one of incoming tiles 68 corresponding to pieces of incoming information arranged in chronological order, the performance module 110 can perform a function corresponding to the incoming tile 68. For example, if the tap operation Tt is performed on the incoming tile 68 showing "INCOMING EMAIL XXX" as illustrated in FIG. 23, the performance module 110 can perform the email function, and can display an incoming email including details (the sender is "XXX") indicated by the incoming tile 68 on the display 14 as illustrated in FIG. 24. This means that the user can select any of a plurality of pieces of incoming information, and cause the mobile phone 10 to perform a function based on the selected piece of incoming information.

As described above, by selecting a piece of incoming information (a functional tile 66 or an incoming tile 68) displayed on the display 14, the user can cause the mobile phone 10 to perform a function corresponding to the piece of incoming information. As a result, the user can easily cause the mobile phone 10 to perform the function using the piece of incoming information.

Figure 25:
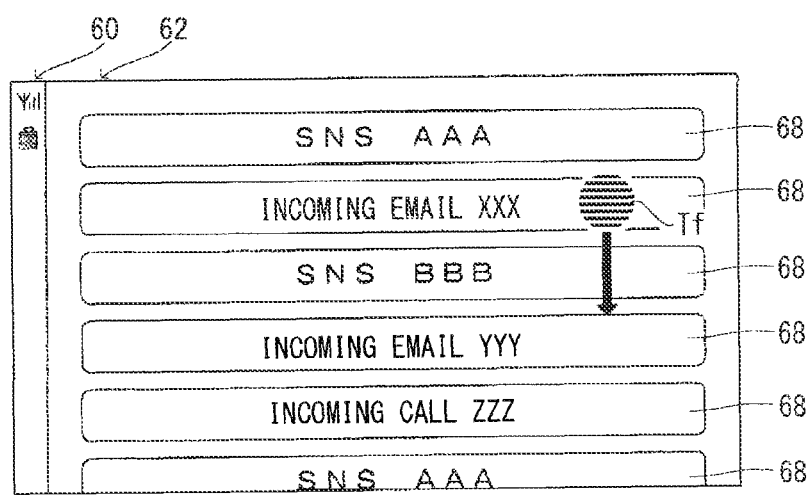
FIG. 25 illustrates an example of performing a flick operation on a piece of incoming information displayed on the display.
Figure 26:
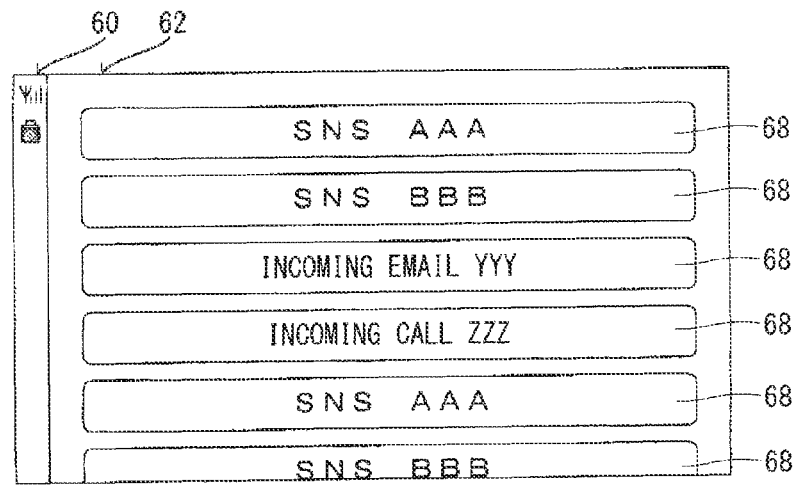
FIG. 26 illustrates an example of removing display of the piece of incoming information in accordance with the flick operation performed on the piece of incoming information displayed on the display.
Figure 27:
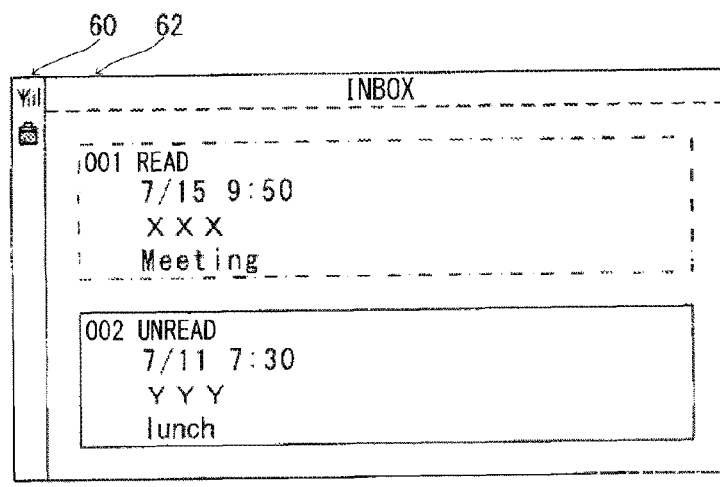
FIG. 27 illustrates an example of setting a piece of information obtained in an event corresponding to the piece of incoming information to a checked state in accordance with the flick operation performed on the piece of incoming information displayed on the display.

A case where the flick operation is performed on an incoming tile 68 is described with reference to FIGS. 25 to 27. When the downward flick operation is performed on an incoming tile 68, the predetermined processing performance module 107 (setting module 108) can delete a piece of incoming information corresponding to the incoming tile 68 from the RAM 46, and set a piece of information obtained in a corresponding event to a checked state. The predetermined processing performance module 107 (deletion module 109) can then delete the incoming tile 68 which has been displayed on the display 14 and on which the downward flick operation has been performed. For example, if the flick operation Tf is performed downwards on the incoming tile 68 showing "INCOMING EMAIL XXX" as illustrated in FIG. 25, display of the incoming tile 68 disappears as illustrated in FIG. 26, and a corresponding piece of incoming information is deleted from the RAM 46. As illustrated in FIG. 27, an incoming email corresponding to the piece of incoming information deleted from the RAM 46 is set to a read state.

Figure 28:
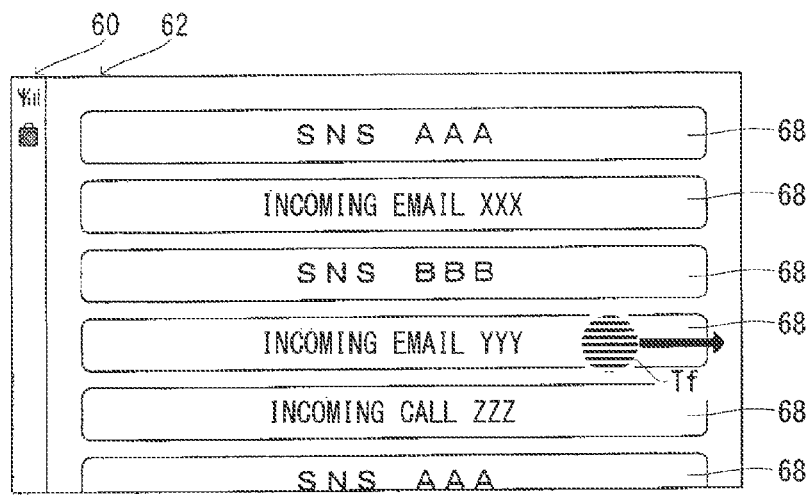
FIG. 28 illustrates an example of performing a flick operation on a piece of incoming information displayed on the display.
Figure 29:
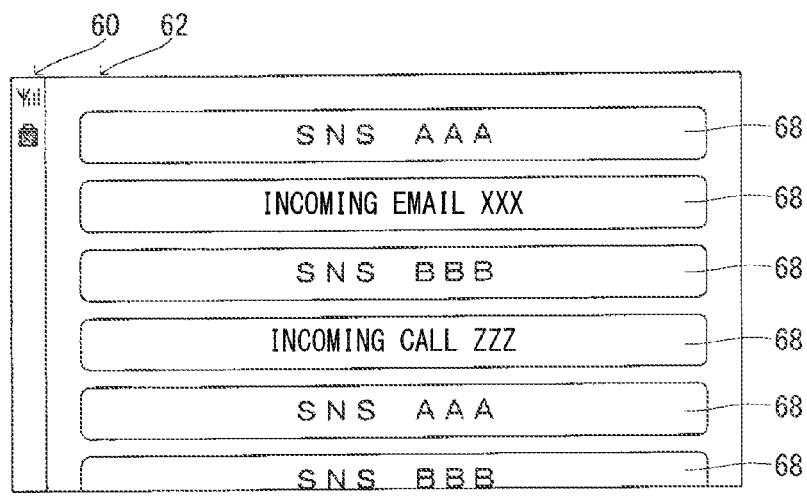
FIG. 29 illustrates an example of removing display of the piece of incoming information in accordance with the flick operation performed on the piece of incoming information displayed on the display.
Figure 30:
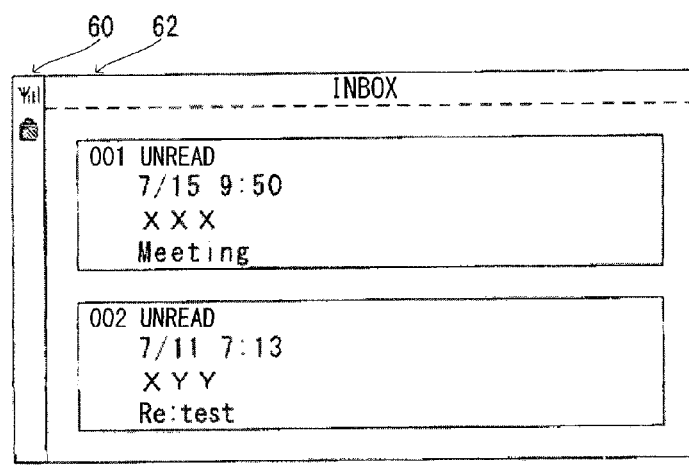
FIG. 30 illustrates an example of deleting a piece of information obtained in an event corresponding to the piece of incoming information in accordance with the flick operation performed on the piece of incoming information displayed on the display.

When the rightward flick operation is performed on an incoming tile 68, the predetermined processing performance module 107 can delete a piece of incoming information corresponding to the incoming tile 68 from the RAM 46, and delete a piece of information obtained in an event corresponding to the piece of incoming information. Specifically, if the flick operation Tf is performed to the right on an incoming tile 68 showing "INCOMING EMAIL YYY" as illustrated in FIG. 28, display of the incoming tile 68 disappears as illustrated in FIG. 29, and a corresponding piece of incoming information is deleted from the RAM 46. As illustrated in FIG. 30, an incoming email corresponding to the deleted piece of incoming information is also deleted.

As described above, the user can set a piece of information obtained in an event corresponding to a piece of incoming information to a checked state and delete the obtained piece of information after checking an incoming tile 68.

Although not illustrated, when the upward flick operation is performed on a functional tile 66, the predetermined processing performance module 107 can perform response processing if a function corresponding to the functional tile 66 on which the upward flick operation has been performed is a function that can respond. For example, if the upward flick operation is performed on the functional tile 80 corresponding to the email function, the predetermined processing performance module 107 can perform processing to create a reply email to an incoming email corresponding to a piece of incoming information. If the upward flick operation is performed on the functional tile 81 corresponding to the phone function, the predetermined processing performance module 107 can perform processing to display a screen in which a call to a caller corresponding to a piece of incoming information can be made. If the upward flick operation is performed on the functional tile 82 corresponding to the SNS function, the predetermined processing performance module 107 can perform processing to reply to a comment corresponding to a piece of incoming information. In other embodiments, when the long-tap operation is performed on the functional tile 81 corresponding to the phone function, a call may be made without making any prior confirmation to the user only if a caller is registered in the address book.

Although not illustrated, when the leftward flick operation is performed on an incoming tile 68, the predetermined processing performance module 107 can register a piece of information on a person who has caused an event corresponding to a piece of incoming information in the mobile phone 10 (storage) if the piece of information can be registered. For example, if the leftward flick operation is performed on the functional tile 80 corresponding to the email function, the predetermined processing performance module 107 can perform processing to register an email address and the like of a sender of an incoming email corresponding to a piece of incoming information in the address book. If the leftward flick operation is performed on the functional tile 81 corresponding to the phone function, the predetermined processing performance module 107 can perform processing to register a phone number and the like of a caller corresponding to a piece of incoming information in the address book.

When the attitude of the mobile phone 10 changes from the vertical attitude to the horizontal attitude in a state in which a single piece of incoming information is stored in the RAM 46, the piece of incoming information is not displayed, but a function is performed based on the piece of incoming information. For example, if the attitude of the mobile phone 10 changes from the vertical attitude to the horizontal attitude in a state in which a single piece of incoming information of the email function is stored in the RAM 46, the email function is performed so that an incoming email corresponding to the piece of incoming information is displayed as illustrated in FIG. 16. In a case where a single functional tile 66 showing a single piece of incoming information is displayed on the display 14, when the tap operation is performed on the functional tile 66, a function may be performed based on the single piece of incoming information without displaying an incoming tile 68 as illustrated in FIG. 14.

Figure 31:
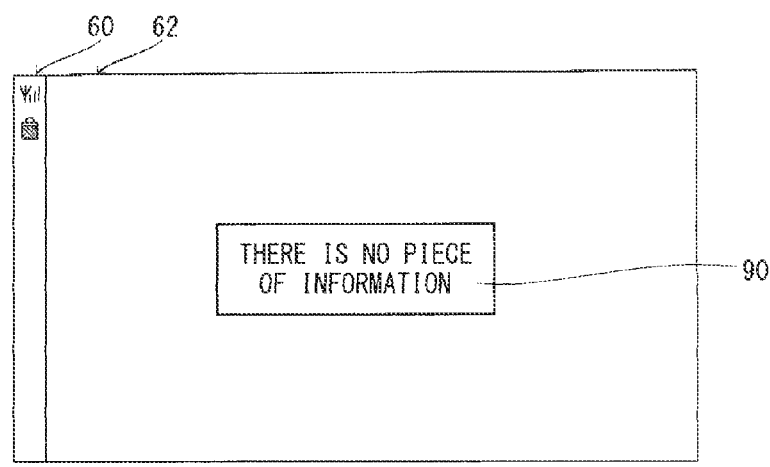
FIG. 31 illustrates a message displayed on the display.

When the attitude of the mobile phone 10 is switched to the horizontal attitude in a state in which no piece of incoming information is stored in the RAM 46, the notification module 111 can notify the user that no piece of incoming information is stored. For example, the notification module 111 can display a message 90 "THERE IS NO PIECE OF INCOMING INFORMATION" on the display 14 as illustrated in FIG. 31. This allows the user to know that no piece of incoming information is stored. The user thus does not have to suspect a failure of the mobile phone 10 even if the screen is not switched when the mobile phone 10 is switched to the horizontal attitude. In other embodiments, however, the home screen may be switched to horizontal display, or display of the home screen may not change.

Figures 32, 33:
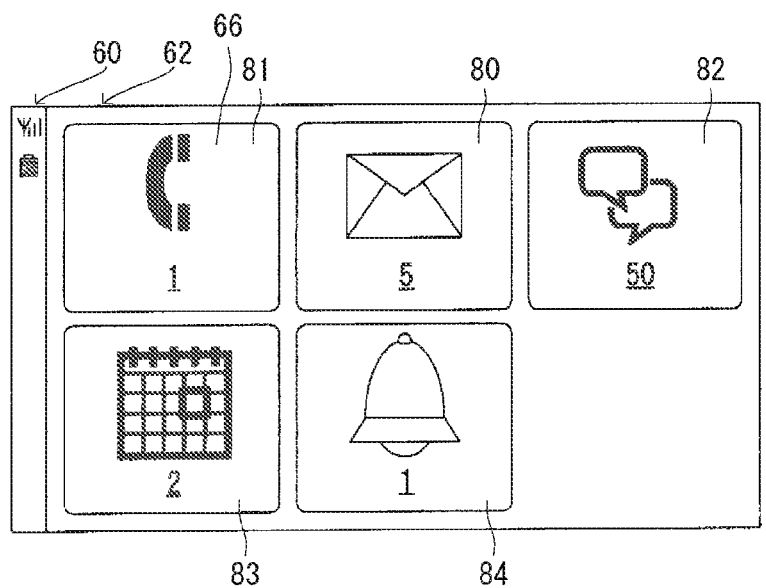
FIG. 32 illustrates an example of configuration of an incoming information table stored in RAM.
FIG. 33 illustrates an example of displaying pieces of incoming information on the display.

FIG. 32 illustrates an example of an incoming information table in which pieces of incoming information are stored. The incoming information table includes a column of time in which time at which an event has occurred is stored, a column of a function in which a function corresponding to the event is stored, and a column of details in which at least part of a piece of information obtained in the event is stored. The pieces of incoming information are stored in respective rows in accordance with time at which an event has occurred. For example, if an event of posting of a comment occurs through performance of the SNS function at 10:32 on Jul. 15, 2013, and a person who has posted the comment is "AAA", "Jul. 15, 2013 10:32:00" is stored in the column of time, "SNS" is stored in the column of the function, and "AAA" is stored in column of the details. When a piece of incoming information is displayed, the piece of incoming information is displayed based on the incoming information table. As described above, processing using pieces of incoming information can easily be performed by storing the pieces of incoming information in the incoming information table for management.

In other embodiments, functions may be prioritized, and, when pieces of incoming information are displayed, the pieces of incoming information may be displayed in accordance with the priority. For example, if pieces of incoming information are displayed by function when the priority is set to decrease in the order of the phone function, the email function, and the SNS function, the functional tile 81 corresponding to the phone function is displayed at a leftmost portion, and the functional tile 80 corresponding to the email function and the functional tile 82 corresponding to the SNS function are then displayed as illustrated in FIG. 33. The pieces of incoming information may be displayed not in descending order of priority given to the function but in descending order of the number of pieces of incoming information. The display size of each functional tile 66 may be changed based on the priority and the like.

In other embodiments, frequency of use by the user may be reflected in display of the pieces of incoming information. For example, if the frequency of use decreases in the order of the SNS function, the email function, and the schedule function, the functional tile 82 corresponding to the SNS function is displayed at the leftmost portion, and the functional tile 80 corresponding to the email function and the functional tile 83 corresponding to the schedule function are then displayed.

In yet other embodiments, the display order of the pieces of incoming information may be set in accordance with a time period during which each of the pieces of incoming information is displayed. For example, pieces of incoming information of a function such as a news function are displayed preferentially during morning hours, and pieces of incoming information of the SNS function are displayed preferentially during night hours. The user may set any display order of the pieces of incoming information.

In other embodiments, incoming tiles 68 corresponding to respective pieces of incoming information may be displayed in chronological order when the attitude of the mobile phone 10 changes to the clockwise horizontal attitude. The user may set any states of the pieces of incoming information displayed when the attitude of the mobile phone 10 changes to the horizontal attitude.

One embodiment has been briefly described above. One embodiment is described in detail below with use of a memory map illustrated in FIG. 34 and flow charts illustrated in FIGS. 35 to 40.

Figure 34:
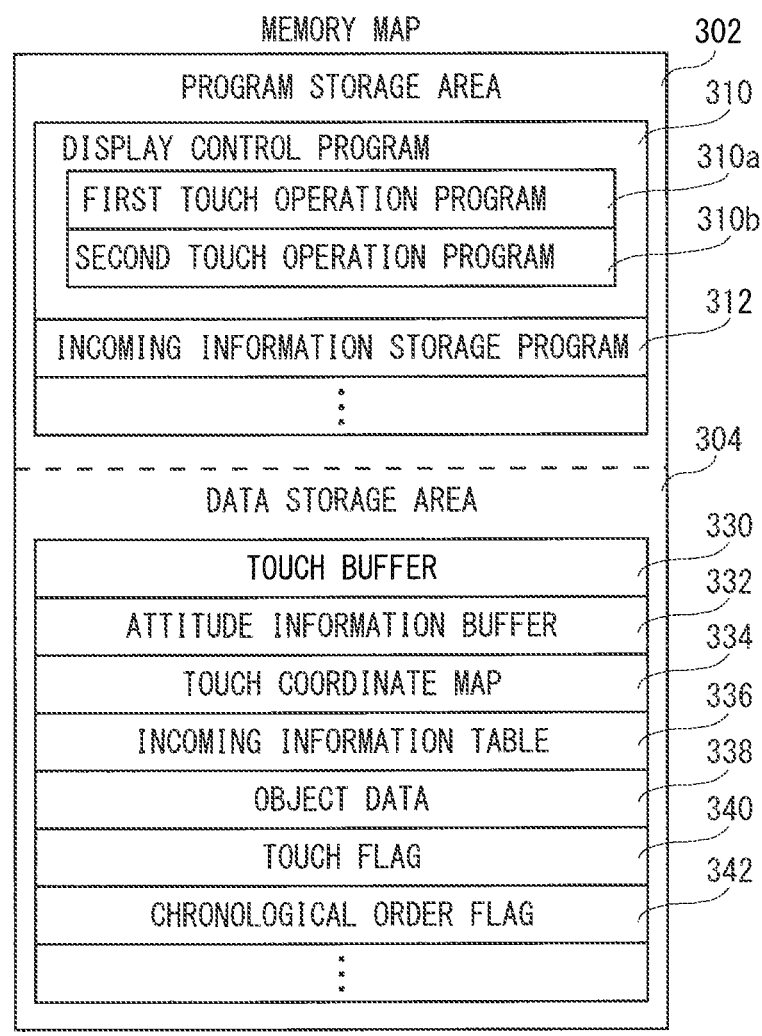
FIG. 34 illustrates an example of a memory map of the RAM.

As illustrated in FIG. 34, a program storage area 302 and a data storage area 304 are formed in the RAM 46. The program storage area 302 is an area for reading and storing (developing) part or all of program data preset in the flash memory 44 (FIG. 2) as described above.

In the program storage area 302, a display control program 310 for controlling display of tiles and an incoming information storage program 312 for storing pieces of incoming information based on events that occurred are stored. As subroutines of the display control program 310, a first touch operation program 310a and a second touch operation program 310b are also stored in the program storage area 302.

Programs for performing applications and functions, such as the email function and the browser function, are stored in the program storage area 302.

Next, in the data storage area 304 of the RAM 46, a touch buffer 330 and an attitude information buffer 332 are provided, and a touch coordinate map 334, an incoming information table 336, object data 338, and the like are stored. A touch flag 340, a chronological order flag 342, and the like are also provided in the data storage area 304.

Data on touch coordinates output from the touch panel control circuit 48 is stored in the touch buffer 330. Data on accelerations and angular velocities output from the attitude sensor 50 is temporarily stored in the attitude information buffer 332. The processor 30 can detect the attitude and the like of the mobile phone 10 based on information stored in the attitude information buffer 332.

The touch coordinate map 334 is data for associating touch coordinates determined through the touch operation with display coordinates on the display 14. This means that results of the touch operation performed on the touch panel 16 are reflected in display on the display 14 based on the touch coordinate map 334. The incoming information table 336 is a table having configuration illustrated in FIG. 32, for example, and stores pieces of incoming information. The object data 338 is data for displaying objects including the tiles 64 displayed on the display 14.

The touch flag 340 is a flag for determining whether the touch panel 16 is touched. The touch flag 340 is configured by a one-bit register, for example. When the touch flag 340 is tuned on (flagged), a data value "1" is set to the register. On the other hand, when the touch flag 340 is turned off (not flagged), a data value "0" is set to the register. The touch flag 340 is switched on and off based on output of the touch panel control circuit 48.

The chronological order flag 342 is a flag for determining whether to display pieces of incoming information in chronological order. For example, the chronological order flag 342 is turned on when the attitude of the mobile phone 10 changes to the horizontal attitude with the touch panel 16 being touched. The chronological order flag 342 is off in an initial state, and is also off when the above-mentioned condition is not satisfied. Detailed description on configuration of the chronological order flag 342 is omitted as the chronological order flag 342 has approximately the same configuration as the touch flag 340.

In the data storage area 304, incoming emails may be stored, and another flag or timer (counter) required to run a program may be provided.

Figure 35:
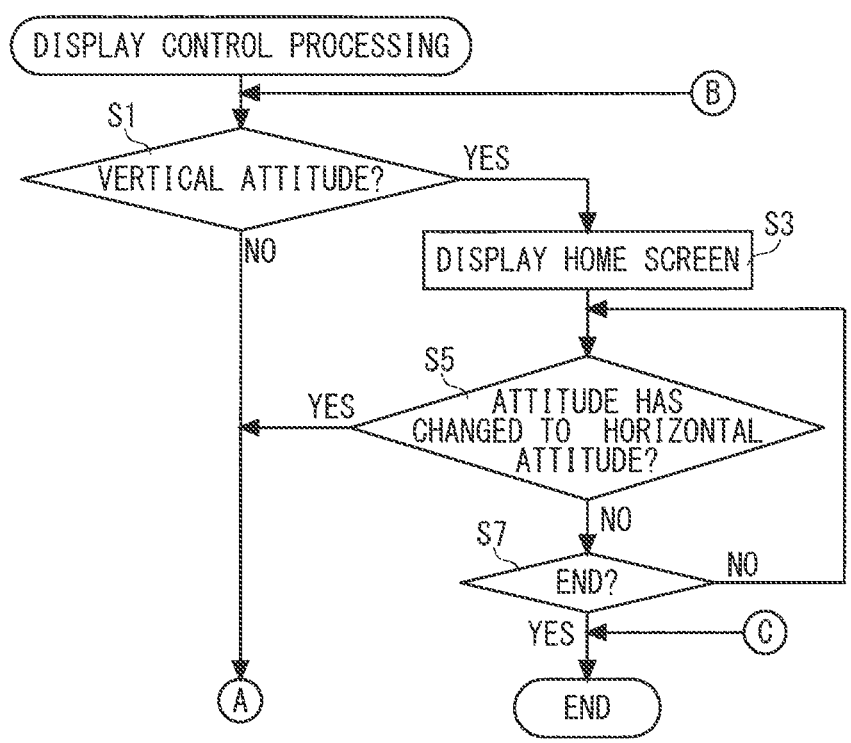
FIG. 35 illustrates a flow chart showing an example of a part of display control processing performed by the processor.
Figure 36:
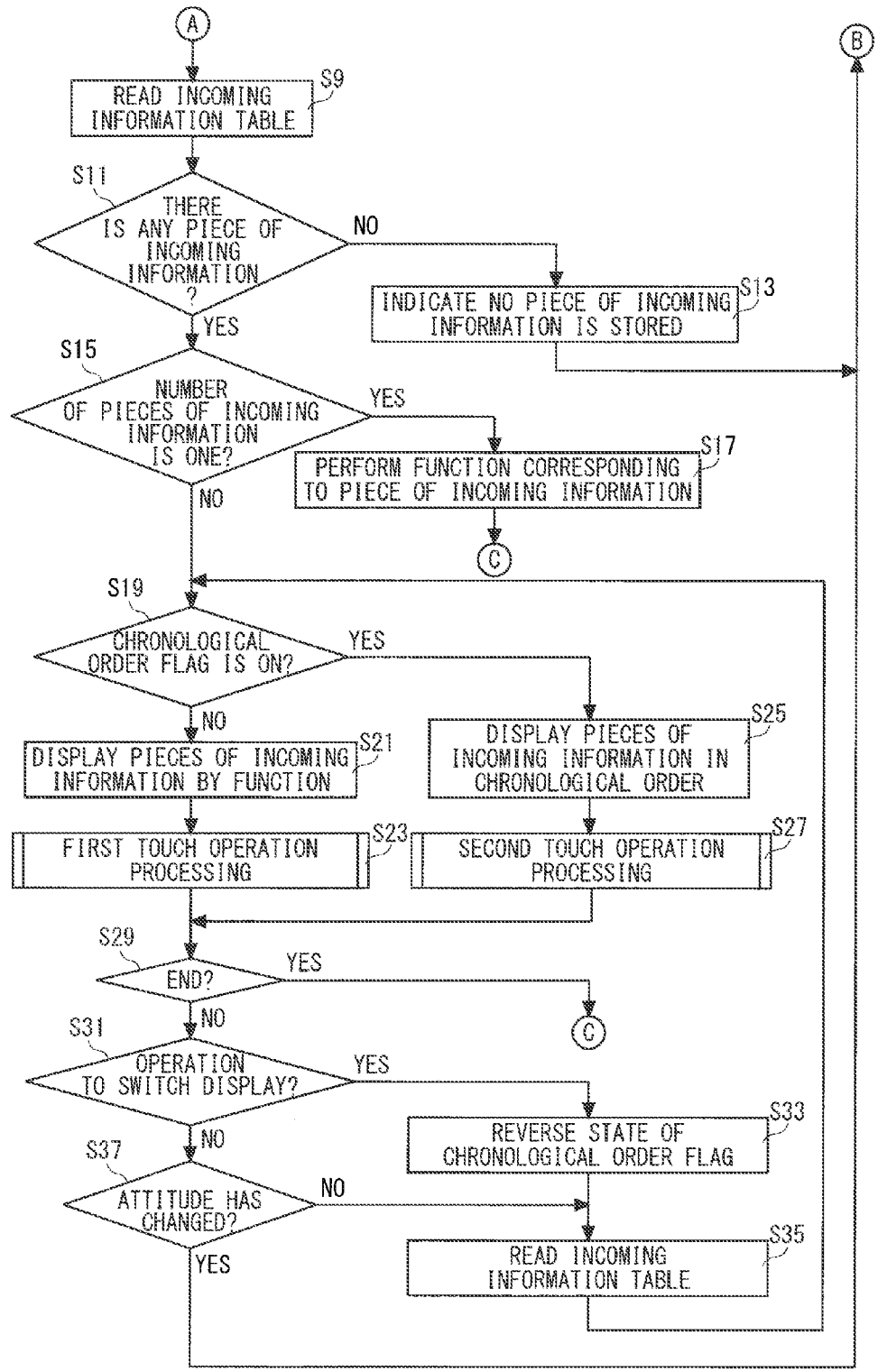
FIG. 36 illustrates a flow chart showing an example of another part of the display control processing performed by the processor.
Figure 37:
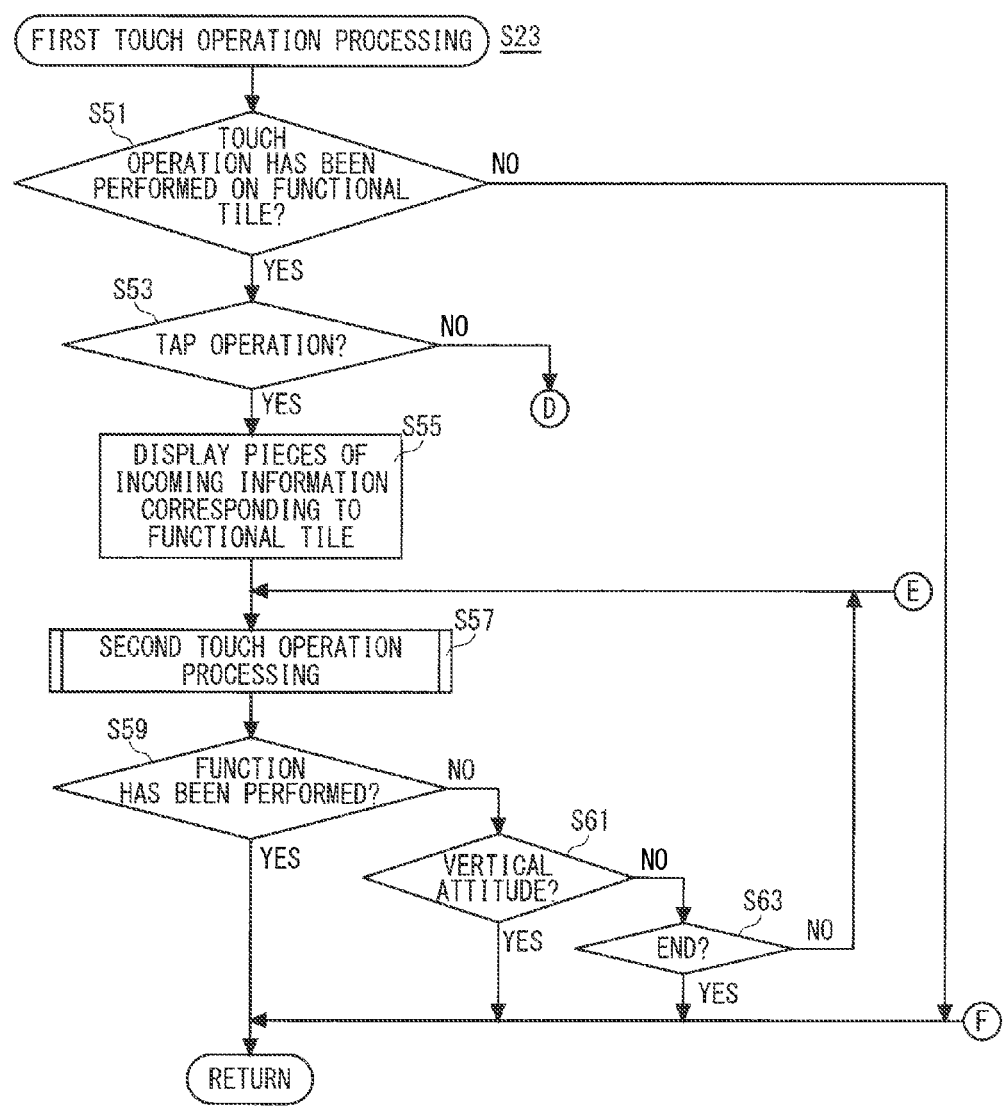
FIG. 37 illustrates a flow chart showing an example of a part of first touch operation processing performed by the processor.
Figure 38:
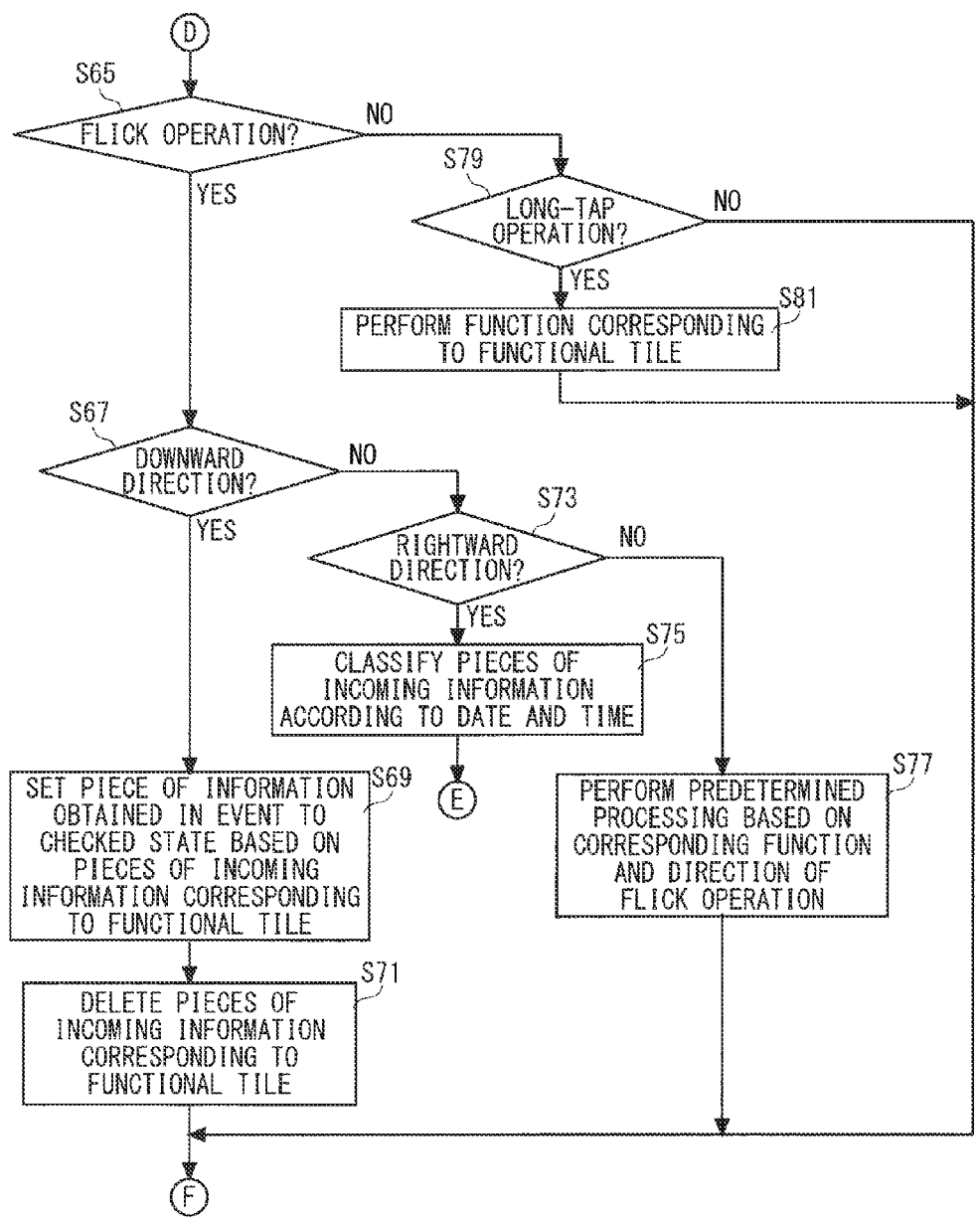
FIG. 38 illustrates a flow chart showing an example of another part of the first touch operation processing performed by the processor.
Figure 39:
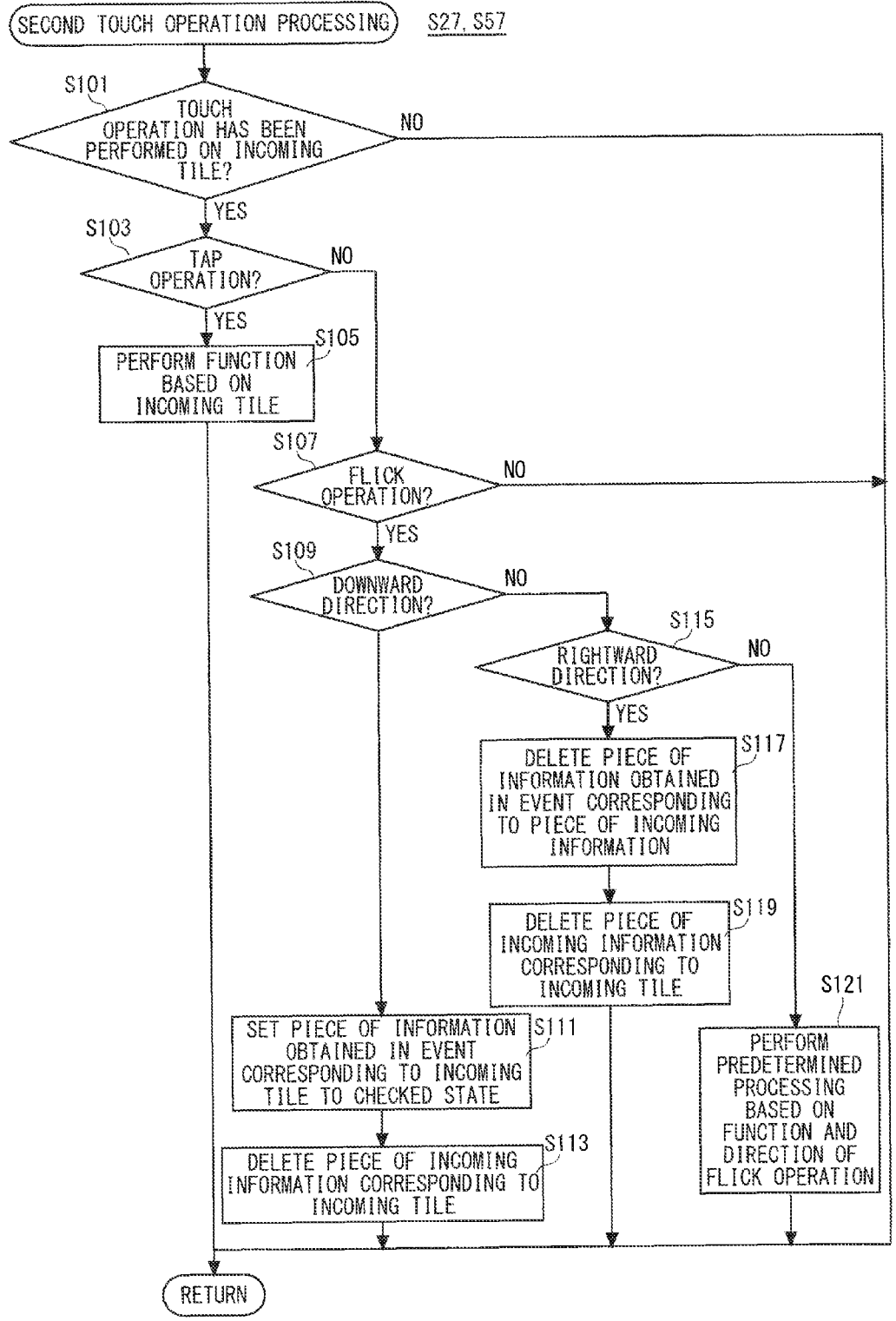
FIG. 39 illustrates a flow chart showing an example of second touch operation processing performed by the processor.
Figure 40:
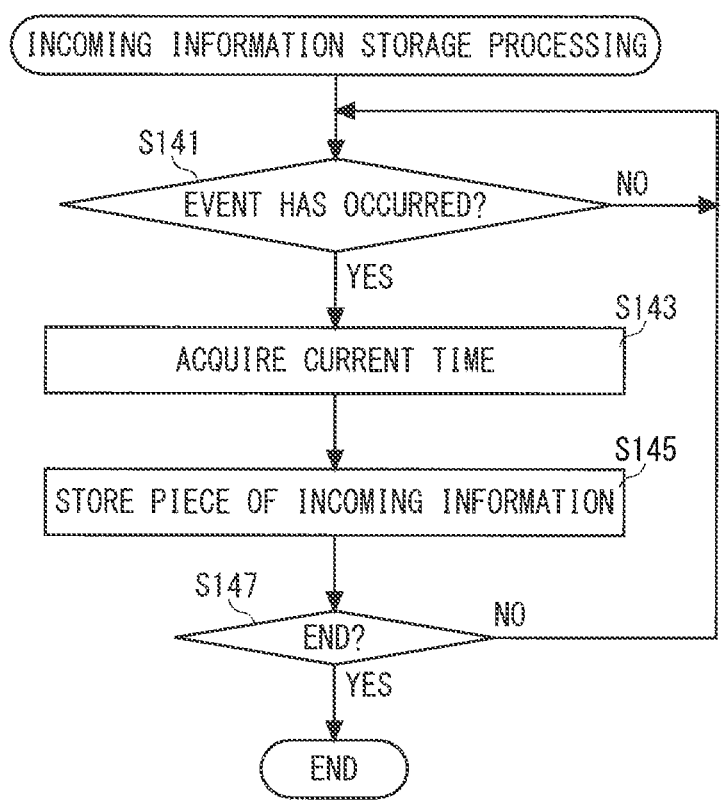
FIG. 40 illustrates a flow chart showing an example of incoming information storage processing performed by the processor.

The processor 30 can process a plurality of tasks, including display control processing illustrated in FIGS. 35 and 36, first touch operation processing illustrated in FIGS. 37 and 38, second touch operation processing illustrated in FIG. 39, and incoming information storage processing illustrated in FIG. 40, in parallel under control of an OS, such as a Windows®-based OS and a Linux®-based OS including Android® and iOS®.

The display control processing illustrated in FIGS. 35 and 36 starts when the home key 22c is pressed, for example. The processor 30 determines whether the mobile phone 10 is in the vertical attitude in step S1. This means that the processor 30 determines whether the mobile phone 10 is in the vertical attitude illustrated in FIG. 4 based on attitude information stored in the attitude information buffer 332. If "NO" in step S1, i.e., the mobile phone 10 is in the horizontal attitude, the processor 30 performs processing in and after step S9 illustrated in FIG. 36.

On the other hand, if "YES" in step S1, i.e., the mobile phone 10 is in the vertical attitude, the processor 30 (first display control module 101) displays the home screen in step S3. For example, the home screen as illustrated in FIG. 8 is displayed on the display 14. Next, the processor 30 determines whether the attitude has changed to the horizontal attitude in step S5. This means that it is determined whether the attitude of the mobile phone 10 has changed from the vertical attitude to the horizontal attitude based on the attitude information stored in the attitude information buffer 332. If "NO" in step S5, i.e., the mobile phone 10 remains in the vertical attitude, the processor 30 determines whether the processing ends in step S7. This means that it is determined whether an operation to end display of the home screen has been performed. If "YES" in step S7, e.g., the tap operation has been performed on a tile 64 displayed in the home screen, the processor 30 ends the display control processing as the home screen transitions to a screen of a function.

If "NO" in step S7, e.g., an operation to transition from the home screen to another screen has not been performed, processing returns to processing in step S5. If "YES" is step S5, e.g., the attitude of the mobile phone 10 has changed from the vertical attitude to the counterclockwise horizontal attitude, the processor 30 reads the incoming information table 336 in step S9. This means that the incoming information table 336 is read from the RAM 46.

Next, the processor 30 determines whether there is any piece of incoming information in step S11. This means that the processor 30 determines whether any piece of incoming information is stored in the read incoming information table 336. If "NO" in step S11, i.e., no piece of incoming information is stored in the incoming information table 336, the processor 30 (notification module 111) indicates that no piece of incoming information is stored in step S13. For example, the message 90 "THERE IS NO PIECE OF INCOMING INFORMATION" is displayed on the display 14 as illustrated in FIG. 31. When processing in step S13 ends, the processor 30 returns to processing in step S1. If "YES" in step S11, i.e., any piece of incoming information is stored in the incoming information table 336, the processor 30 determines whether the number of pieces of incoming information is one in step S15. This means that the processor 30 determines whether the number of pieces of incoming information stored in the incoming information table 336 is only one. If "YES" in step S15, i.e., the number of stored pieces of incoming information is only one, the processor 30 performs a function corresponding to the piece of incoming information in step S17. For example, if only a piece of incoming information of the email function is stored in the incoming information table 336, the email function is performed so that an incoming email corresponding to the piece of incoming information is displayed as illustrated in FIG. 16. When processing to perform the function ends in step S17, the processor 30 ends the display control processing.

If "NO" in step S15, i.e., a plurality of pieces of incoming information are stored in the incoming information table 336, the processor 30 determines whether the chronological order flag 342 is on in step S19. This means that it is determined whether the attitude of the mobile phone 10 has been switched to the horizontal attitude with the mobile phone 10 being touched, and the chronological order flag 342 has been turned on. If "NO" in step S19, e.g., the attitude of the mobile phone 10 has been switched to the counterclockwise horizontal attitude, and the chronological order flag 342 is off, the processor 30 (second display control module 102 (first incoming information display control module 103)) displays the pieces of incoming information by function on the display 14 in step S21. For example, the pieces of incoming information stored in the incoming information table 336 are classified according to the function, and functional tiles 66 corresponding to the classified pieces of incoming information are displayed as illustrated in FIG. 11. Next, the processor 30 performs the first touch operation processing in step S23. This means that processing to respond to the touch operation performed on the functional tiles 66 is performed. Description on the first touch operation processing is herein omitted as the first touch operation processing is described in detail with use of the flow charts of FIGS. 37 and 38. When processing in step S23 ends, the processor 30 proceeds to processing in step S29.

If "YES" in step S19, e.g., the attitude of the mobile phone 10 has been switched to the clockwise horizontal attitude, and the chronological order flag 342 is on, the processor 30 (second display control module 102 (second incoming information display control module 104)) displays the pieces of incoming information in chronological order on the display 14 in step S25. For example, incoming tiles 68 corresponding to the pieces of incoming information stored in the incoming information table 336 are displayed as illustrated in FIG. 12. Next, the processor 30 performs the second touch operation processing in step S27. This means that processing to respond to the touch operation performed on the incoming tiles 68 is performed. Description on the second touch operation processing is herein omitted as the second touch operation processing is described in detail with use of the flow chart of FIG. 39. When processing in step S27 ends, the processor 30 proceeds to processing in step S29.

When the first touch operation processing or the second touch operation processing ends, the processor 30 determines whether the processing ends in step S29. This means that it is determined whether an operation to remove or transition display on the display 14 has been performed. If "YES" in step S29, e.g., the end key 22b is operated to power off the display 14, the processor 30 ends the display control processing.

If "NO" in step S29, e.g., the end key 22b is not operated, the processor 30 (switching module 106) determines whether an operation to switch display has been performed in step S31. For example, it is determined whether an operation to shake the mobile phone 10 has been performed as the operation to switch between display of the pieces of incoming information by function and display of the pieces of incoming information in chronological order. Specifically, the processor 30 (switching module 106) determines whether the mobile phone 10 has been shaken based on the attitude information stored in the attitude information buffer 332. If "YES" in step S31, i.e., the operation to switch between display of the pieces of incoming information by function and display of the pieces of incoming information in chronological order has been performed, the processor 30 (switching module 106) reverses a state of the chronological order flag 342 in step S33. This means that, when the pieces of incoming information are displayed by function on the display 14, and the chronological order flag 342 is off, the switching module 106 turns on the chronological order flag 342. On the other hand, when the pieces of incoming information are displayed in chronological order on the display 14, and the chronological order flag 342 is on, the switching module 106 turns off the chronological order flag 342. Next, the processor 30 reads the incoming information table 336 in step S35. This means that, since the switching operation has been performed, the incoming information table 336 is read again to switch display of the pieces of incoming information. When processing in step S35 ends, the processor 30 returns to processing in step S19, and the pieces of incoming information are displayed in accordance with the state of the chronological order flag 342.

If "NO" in step S31, i.e., the operation to switch display has not been performed, the processor 30 determines whether the attitude has changed in step S37. This means that it is determined whether the mobile phone 10 has been moved, and the amount of change in value output from the attitude sensor 50 exceeds a threshold. If "NO" in step S37, e.g., the attitude of the mobile phone 10 has not changed, the processor 30 performs processing in step S35, and returns to processing in step S19. This means that the incoming information table 336 is read again, and display of the pieces of incoming information is updated. In other embodiments, the processor 30 may return to processing in step S9 after processing in step S37 ends.

On the other hand, if "YES" in step S37, e.g., the mobile phone 10 has been moved, the processor 30 returns to processing in step S1. This means that, since the mobile phone 10 has been moved, the attitude of the mobile phone 10 is determined again.

FIG. 37 illustrates the flow chart of the first touch operation processing. When processing in step S23 is performed in the display control processing illustrated in FIG. 36, the processor 30 determines whether the touch operation has been performed on a functional tile 66 in step S51. This means that it is determined whether the user has performed the touch operation on the functional tile 66. If "NO" in step S51, i.e., the touch operation has not been performed on the functional tile 66, the processor 30 ends the first touch operation processing, and returns to the display control processing.

If "YES" in step S51, i.e., the touch operation has been performed on the functional tile 66 being displayed, the processor 30 determines whether the tap operation has been performed in step S53. This means that the processor 30 determines whether the tap operation has been performed on the functional tile 66. If "NO" in step S53, i.e., the tap operation has not been performed on the functional tile 66, the processor 30 proceeds to processing in step S65 illustrated in FIG. 38.

If "YES" in step S53, i.e., the tap operation has been performed on the functional tile 66, the processor 30 displays one or more pieces of incoming information corresponding to the functional tile 66 on which the tap operation has been performed in step S55. For example, if the tap operation has been performed on the functional tile 80 corresponding to the email function, incoming tiles 68 corresponding to pieces of incoming information of the email function are displayed as illustrated in FIG. 13.

Next, the processor 30 performs the second touch operation processing in step S57. This means that, since the incoming tiles 68 are displayed, the second touch operation processing is performed to respond to the touch operation performed on the incoming tiles 68. Next, the processor 30 determines whether a function has been performed in step S59. For example, it is determined whether a function has been performed in response to the tap operation performed on an incoming tile 68 in the second touch operation processing. If "YES" in step S59, i.e., the function has been performed, the processor 30 ends the first touch operation processing, and returns to the display control processing. If "NO" in step S59, i.e., the function has not been performed, the processor 30 determines whether the attitude is the vertical attitude in step S61. This means that it is determined whether the attitude of the mobile phone 10 has changed from the horizontal attitude to the vertical attitude. If "YES" in step S61, i.e., the attitude of the mobile phone 10 has changed to the vertical attitude, the processor 30 ends the first touch operation processing, and returns to the display control processing. If "NO" in step S61, i.e., the mobile phone 10 is in the horizontal attitude, the processor 30 determines whether the processing ends in step S63. This means that the processor 30 determines whether the operation to end or switch display on the display 14 has been performed. If "YES" in step S63, e.g., the end key 22b is operated to remove display on the display 14, the processor 30 ends the first touch operation processing, and returns to the display control processing. If "NO" in step S63, e.g., display on the display 14 has not been removed, the processor 30 returns to processing in step S57, and performs the second touch operation processing again. Description on the second touch operation processing is herein omitted as the second touch operation processing is described in detail with use of the flow chart of FIG. 39.

When the tap operation has not been performed on the functional tile 66, the processor 30 determines whether the flick operation has been performed in step S65. This means that it is determined whether the flick operation has been performed on the functional tile 66. If "YES" in step S65, i.e., the flick operation has been performed on the functional tile 66, the processor 30 determines whether the direction is a downward direction in step S67. This means that it is determined whether the downward flick operation has been performed on the functional tile 66. If "YES" in step S67, i.e., the downward flick operation has been performed on the functional tile 66, the processor 30 (predetermined processing performance module 107 (setting module 108)) sets a piece of information obtained in an event to a checked state based on each of one or more pieces of incoming information corresponding to the functional tile 66 in step S69. For example, as illustrated in FIGS. 17 and 18, if the flick operation Tf has been performed downwards on the functional tile 82 corresponding to the SNS function, the setting module 108 sets all the posted comments and the like to a checked state based on the pieces of incoming information of the SNS function. Next, the processor 30 (predetermined processing performance module 107 (deletion module 109)) deletes the pieces of incoming information corresponding to the functional tile 66 in step S71. For example, 50 pieces of incoming information of the SNS function are all deleted. When processing in step S71 ends, the processor 30 ends the first touch operation processing, and returns to the display control processing.

If "NO" in step S67, i.e., the direction of the flick operation is not the downward direction, the processor 30 determines whether the direction is a rightward direction in step S73. This means that it is determined whether the rightward flick operation has been performed on the functional tile 66. If "YES" in step S73, i.e., the rightward flick operation has been performed on the functional tile 66, the processor 30 (predetermined processing performance module 107) classifies the pieces of incoming information according to the date and time in step S75. For example, as illustrated in FIGS. 19 and 20, if the flick operation Tf has been performed to the right on the functional tile 80 corresponding to the email function, and processing in step S75 is performed, the incoming tiles 68 corresponding to the pieces of incoming information of the email function are classified according to the date and time, and displayed. When processing in step S75 ends, the processor 30 returns to processing in step S57. This means that the second touch operation processing is performed as the incoming tiles 68 are displayed.

If "NO" in step S73, i.e., the direction of the flick operation is not the rightward direction, the processor 30 (predetermined processing performance module 107) performs predetermined processing based on the corresponding function and the direction of the flick operation in step S77. For example, when the upward flick operation has been performed on the functional tile 66, the predetermined processing performance module 107 classifies the pieces of incoming information according to the originator, and displays the classified pieces of incoming information on the display 14 if the function corresponding to the functional tile 66 is the email function or the phone function. When the leftward flick operation has been performed on the functional tile 66, the predetermined processing performance module 107 displays the tile showing the number of pieces of incoming information registered in the address book and the tile showing the number of pieces of incoming information not registered in the address book on the display 14 if the function corresponding to the functional tile 66 is the email function or the phone function. After the tiles are displayed as described above, processing to receive the touch operation corresponding to each of the tiles is performed. When processing in step S77 ends, the processor 30 ends the first touch operation processing, and returns to the display control processing.

If "NO" in step S65, i.e., the flick operation has not been performed on the functional tile 66, the processor 30 determines whether the long-tap operation has been performed in step S79. This means that it is determined whether the long-tap operation has been performed on the functional tile 66. If "NO" in step S79, e.g., the touch operation performed on the functional tile 66 cannot be determined, the processor 30 ends the first touch operation processing, and returns to the display control processing. If "YES" in step S79, the processor 30 (performance module 110) performs the function corresponding to the functional tile 66 in step S81. For example, if the long-tap operation has been performed on the functional tile 80 corresponding to the email function as illustrated in FIG. 21, the performance module 110 performs the email function, and displays the email menu screen on the display 14. When processing in step S81 ends, the processor 30 ends the first touch operation processing, and returns to the display control processing.

FIG. 39 illustrates the flow chart of the second touch operation processing. When processing in step S27 is performed in the display control processing illustrated in FIG. 36 or processing in step S57 is performed in the first touch operation processing illustrated in FIG. 37, the processor 30 determines whether the touch operation has been performed on an incoming tile 68 in step S101. This means that the processor 30 determines whether the touch position of the touch operation is included in the display range of the incoming tile 68. If "NO" in step S101, i.e., a position at which no incoming tile 68 is displayed has been touched, the processor 30 ends the second touch operation processing, and returns to processing in a superordinate routine (the display control processing or the first touch operation processing).

If "YES" in step S101, i.e., the touch operation has been performed on the incoming tile 68, the processor 30 determines whether the tap operation has been performed in step S103. This means that it is determined whether the tap operation has been performed on the incoming tile 68 being displayed. If "YES" in step S103, e.g., the tap operation has been performed on the incoming tile 68 corresponding to the email function as illustrated in FIG. 23, the processor 30 (performance module 110) performs the function based on the incoming tile 68 in step S105. For example, if the tap operation Tt has been performed on the incoming tile 68 corresponding to the email function, the performance module 110 performs the email function so that an incoming email corresponding to a piece of incoming information is displayed. When processing in step S105 ends, the processor 30 ends the second touch operation processing, and returns to processing in the superordinate routine.

If "NO" in step S103, i.e., the tap operation has not been performed on the incoming tile 68, the processor 30 determines whether the flick operation has been performed in step S107. This means that it is determined whether the flick operation has been performed on the incoming tile 68. If "NO" in step S107, i.e., the flick operation has not been performed on the incoming tile 68, the processor 30 ends the second touch operation processing, and returns to processing in the superordinate routine.

If "YES" in step S107, i.e., the flick operation has been performed on the incoming tile 68, the processor 30 determines whether the direction is the downward direction in step S109. This means that it is determined whether the downward flick operation has been performed on the incoming tile 68. If "YES" in step S109, e.g., the flick operation Tf has been performed downwards on the incoming tile 68 corresponding to the email function as illustrated in FIG. 25, the processor 30 (predetermined processing performance module 107 (setting module 108)) sets a piece of information obtained in an event corresponding to the incoming tile 68 to a checked state in step S111. For example, if the downward flick operation has been performed on the incoming tile 68 corresponding to the email function, an incoming email corresponding to the incoming tile 68 is set to a read state. If the downward flick operation has been performed on the incoming tile 68 corresponding to the phone function, a history of an incoming call (missed call) corresponding to the incoming tile 68 is set to a checked state. Next, the processor 30 (predetermined processing performance module 107 (deletion module 109)) deletes a piece of incoming information corresponding to the incoming tile 68 in step S113. For example, the piece of incoming information corresponding to the incoming tile 68 corresponding to the email function on which the flick operation has been performed is deleted from the incoming information table 336. When processing in step S113 ends, the processor 30 ends the second touch operation processing, and returns to processing in the superordinate routine.

If "NO" in step S109, i.e., the direction of the flick operation performed on the incoming tile 68 is not the downward direction, the processor 30 determines whether the direction is the rightward direction in step S115. This means that it is determined whether the rightward flick operation has been performed on the incoming tile 68. If "YES" in step S115, e.g., the flick operation Tf has been performed to the right on the incoming tile 68 corresponding to the email function as illustrated in FIG. 28, the processor 30 (predetermined processing performance module 107) deletes a piece of information obtained in an event corresponding to a piece of incoming information in step S117. For example, the predetermined processing performance module 107 deletes an incoming email corresponding to the incoming tile 68 corresponding to the email function. If the rightward flick operation has been performed on the incoming tile 68 corresponding to the phone function, the predetermined processing performance module 107 deletes a history of an incoming call corresponding to the incoming tile 68. Next, the processor 30 (predetermined processing performance module 107) deletes the piece of incoming information corresponding to the incoming tile 68 in step S119. For example, if the rightward flick operation has been performed on the incoming tile 68 corresponding to the email function, the predetermined processing performance module 107 deletes the piece of incoming information corresponding to the incoming tile 68 from the incoming information table 336. When processing in step S119 ends, the processor 30 ends the second touch operation processing, and returns to processing in the superordinate routine.

If "NO" in step S115, i.e., the direction of the flick operation having been performed on the incoming tile 68 is the upward direction or the leftward direction, the processor 30 (predetermined processing performance module 107) performs predetermined processing based on the function and the direction of the flick operation in step S121. For example, when the upward flick operation has been performed on the functional tile 66, the predetermined processing performance module 107 performs the response processing if the function is the function that can respond. When the leftward flick operation has been performed on the functional tile 66, the predetermined processing performance module 107 registers the piece of information on the person who has caused the event corresponding to the piece of incoming information in the storage if the piece of information can be registered. When processing in step S121 ends, the processor 30 ends the second touch operation processing, and returns to processing in the superordinate routine.

FIG. 40 illustrates the flow chart of the incoming information storage processing. The incoming information storage processing starts when the mobile phone 10 is powered on, for example. The processor 30 determines whether an event has occurred in step S141. For example, it is determined whether an incoming email has been received through performance of the email function. If "NO" in step S141, i.e., the event has not occurred, the processor 30 repeats processing in step S141.

On the other hand, if "YES" in step S141, e.g., the incoming email has been received, the processor 30 acquires the current time in step S143. This means that the processor 30 acquires information on the date and time output from the RTC 30a. Next, the processor 30 (storage control module 105) stores a piece of incoming information in the storage in step S145. For example, the piece of incoming information is created based on details of the received incoming email (an address, a subject, and part of text) and the information on the date and time of the reception, and the created piece of incoming information is stored in the incoming information table 336.

Next, the processor 30 determines whether the processing ends in step S147. For example, it is determined whether an operation to power off the mobile phone 10 has been performed. If "NO" in step S147, e.g., the operation to power off the mobile phone 10 has not been performed, the processor 30 returns to processing in step S141. If "YES" in step S147, e.g., the operation to power off the mobile phone 10 has been performed, the processor 30 ends the incoming information storage processing.

In a case where the function is performed based on the piece of incoming information or the piece of incoming information is deleted, a popup window may be displayed to make prior confirmation.

In yet other embodiments, the mobile phone 10 may include a hard key such as a cursor key in place of the touch panel 16. In this case, the functional tiles 66 and the incoming tiles 68 are selected not through the tap operation but through a key operation performed on the hard key.

In one embodiment described above, a term "larger than" the threshold is used, but the state of being "larger than the threshold" includes the state of being "equal to or larger than the threshold". Similarly, the state of being "smaller than the threshold" includes the state of being "equal to or smaller than the threshold" and the state of being "below the threshold".

The programs used in one embodiment may be stored in an HDD of a server for data distribution, and may be distributed to the mobile phone 10 through a network. A recording medium, such as an optical disk including CD, DVD, and Blue-ray Disk (BD), USB memory, and a memory card, storing a plurality of programs may be sold or distributed. When programs downloaded through the above-mentioned server, recording medium, and the like are installed on a mobile phone having equivalent configuration to that in one embodiment, equivalent effects to those obtained in one embodiment can be obtained.

Specific numerical values appearing in the present specification are mere examples, and can appropriately be changed in accordance with the change of specifications of products and the like.

While the present disclosure has been described in detail, the foregoing description is in all aspects illustrative and not restrictive. Numerous modifications not having been described can be devised without departing from the scope of the present disclosure.

The invention claimed is:

1. A mobile terminal comprising:
a display device;
a detector that detects an attitude of the mobile terminal;
a memory that stores, when an event occurs, therein at least one piece of incoming information concerning the event; and
at least one processor configured to:
display, when the detector detects a first attitude, a first tiled object relating to the at least one piece of incoming information and a second tiled object not relating to the at least one piece of incoming information on the display device; and
display, when the detector detects a second attitude, the at least one piece of incoming information stored in the storage on the display device.

2. The mobile terminal according to claim 1, wherein:
the at least one piece of incoming information on the event displayed by the second display control module on the display device corresponds to a function, and
the at least one processor is further configured to:
perform, when the at least one piece of incoming information is selected, a function corresponding to the at least one piece of incoming information.

3. The mobile terminal according to claim 1, further comprising:
a touch panel located on the display device; and
wherein the at least one processor is further configured to perform predetermined processing when a touch operation is performed on the at least one piece of incoming information displayed on the display device.

4. The mobile terminal according to claim 3, wherein:
the at least one processor is further configured to:
set, when a particular touch operation is performed on the at least one piece of incoming information displayed on the display device, a piece of information obtained in the event corresponding to the at least one piece of incoming information to a checked state; and
delete, when the particular touch operation is performed on the at least one piece of incoming information displayed on the display device, the at least one piece of incoming information.

5. The mobile terminal according to claim 2, wherein:
the at least one piece of incoming information comprises a plurality of pieces of incoming information, and
the at least one processor is further configured to display the pieces of incoming information stored in the storage by function on the display device.

6. The mobile terminal according to claim 5, wherein:
when any piece of incoming information is selected in a state in which the pieces of incoming information stored in the storage are displayed by function on the display device, a piece of incoming information corresponding to the function is displayed on the display device.

7. The mobile terminal according to claim 1, wherein:
the at least one piece of incoming information comprises a plurality of pieces of incoming information, and
the at least one processor is further configured to display the pieces of incoming information stored in the storage in chronological order on the display device.

8. The mobile terminal according to claim 5, wherein the at least one processor is further configured to:
display the pieces of incoming information stored in the storage in chronological order on the display device, and
switch, when the detector detects a particular operation of the mobile terminal, between display of the pieces of incoming information stored in the storage by function and display of the pieces of incoming information stored in the storage in chronological order.

9. The mobile terminal according to claim 1, wherein the at least one processor is further configured to:
indicate, when the detector detects the second attitude in a state in which no piece of incoming information is stored in the storage, that no piece of incoming information is stored in the storage.

10. An incoming information display method for use in a mobile terminal including a processor, storage, a display device, and a detector that detects an attitude of the mobile terminal, the method comprising:

storing, when an event occurs, a piece of incoming information concerning the event in the storage;

displaying, when the detector detects a first attitude, a first tiled object relating to the piece of incoming information and a second tiled object not relating to the piece of incoming information on the display device; and displaying, when the detector detects a second attitude, the piece of incoming information stored in the storage.

\* \* \* \* \*